(12) United States Patent
Stebniski et al.

(10) Patent No.: US 11,340,191 B2
(45) Date of Patent: *May 24, 2022

(54) UV-ABSORBANCE MULTICHANNEL CAPILLARY ELECTROPHORESIS SYSTEM

(71) Applicant: Agilent Technologies, Inc., Santa Clara, CA (US)

(72) Inventors: Michael Stebniski, Ankeny, IA (US); Bruce R. Boeke, Ames, IA (US); Martin Chris Foster, Nevada, IA (US); Scott Stueckradt, Huxley, IA (US); Thomas J. Kurt, Ames, IA (US)

(73) Assignee: Agilent Technologies, Inc., Santa Clara, CA (US)

( * ) Notice: Subject to any disclaimer, the term of this patent is extended or adjusted under 35 U.S.C. 154(b) by 767 days.

This patent is subject to a terminal disclaimer.

(21) Appl. No.: 15/677,535

(22) Filed: Aug. 15, 2017

(65) Prior Publication Data

US 2017/0370878 A1  Dec. 28, 2017
US 2021/0080428 A9  Mar. 18, 2021

Related U.S. Application Data

(63) Continuation-in-part of application No. 14/822,956, filed on Aug. 11, 2015, now abandoned, which is a
(Continued)

(51) Int. Cl.
*G01N 27/447* (2006.01)

(52) U.S. Cl.
CPC . *G01N 27/44791* (2013.01); *G01N 27/44721* (2013.01); *G01N 27/44743* (2013.01); *G01N 27/44782* (2013.01)

(58) Field of Classification Search
CPC ............................ G01N 27/447–44752; G01N 27/44756–44791; B01L 2400/0415; B01L 2400/0421; C07K 1/28; B01D 57/02
(Continued)

(56) References Cited

U.S. PATENT DOCUMENTS 5,122,248 A   6/1992  Karger et al.
5,292,416 A   3/1994  Novotny et al.
(Continued)

FOREIGN PATENT DOCUMENTS

EP   0457748 A1   11/1991
EP   0527652 A2    2/1993
(Continued)

OTHER PUBLICATIONS

USPTO Non-Final Office Action dated Feb. 7, 2020 for U.S. Appl. No. 16/007,624 (16 pages).
(Continued)

*Primary Examiner* — Maris R Kessel

(57) ABSTRACT

A capillary electrophoresis system includes a capillary reservoir. The capillary reservoir includes a capillary tip flow chamber configured to receive respective capillary tips and to conduct fluid past the capillary tips, and an electrode flow chamber in which an electrode is disposed and configured to conduct fluid past the electrode, the electrode flow chamber being separate from and in fluid communication with the capillary tip flow chamber. An ultraviolet (UV) light absorbance-based multiplexed capillary electrophoresis system includes a first enclosure and a second enclosure. The first enclosure covers a UV light source, and includes a slit. The second enclosure covers the first enclosure, a collimating lens, and a capillary window.

12 Claims, 28 Drawing Sheets

Related U.S. Application Data continuation of application No. 13/470,870, filed on May 14, 2012, now Pat. No. 9,140,666, which is a continuation-in-part of application No. 29/421,549, filed on Mar. 15, 2012, now Pat. No. Des. 689,621.

(60) Provisional application No. 61/643,411, filed on May 7, 2012.

(58) Field of Classification Search
USPC .................................................. 204/601–605
See application file for complete search history.

(56) References Cited

U.S. PATENT DOCUMENTS

| | | | |
|---|---|---|---|
| 5,324,401 | A | 6/1994 | Yeung |
| 5,336,383 | A | 8/1994 | Allington |
| 5,342,492 | A | 8/1994 | Dadoo et al. |
| 5,582,705 | A | 12/1996 | Yeung et al. |
| 5,695,626 | A | 12/1997 | Yeung |
| 5,861,806 | A | 1/1999 | Vories et al. |
| 5,900,934 | A | 5/1999 | Gilby et al. |
| 6,013,166 | A | 1/2000 | Heller |
| 6,027,627 | A | 2/2000 | Li et al. |
| 6,329,139 | B1 | 12/2001 | Nova et al. |
| 6,828,567 | B2 | 12/2004 | Amirkhanian |
| 6,833,062 | B2 | 12/2004 | Kennedy |
| 7,118,659 | B2 | 10/2006 | Kurt |
| 7,534,335 | B2 * | 5/2009 | Kennedy .......... G01N 27/44704 204/601 |
| 7,834,278 | B1 | 11/2010 | Zeiss et al. |
| 8,216,512 | B2 | 7/2012 | Winther et al. |
| 2001/0023825 | A1 | 9/2001 | Frumin et al. |
| 2001/0040094 | A1 * | 11/2001 | Inaba .............. G01N 27/44782 204/603 |
| 2002/0108857 | A1 | 8/2002 | Paschetto |
| 2002/0113213 | A1 | 8/2002 | Amirkhanian et al. |
| 2003/0062265 | A1 | 4/2003 | King |
| 2004/0168919 | A1 * | 9/2004 | Kurt ................. G01N 27/44743 204/456 |
| 2005/0067285 | A1 * | 3/2005 | Inaba .............. G01N 27/44782 204/601 |
| 2006/0006066 | A1 * | 1/2006 | Yamazaki ........ G01N 27/44743 204/451 |
| 2006/0006068 | A1 | 1/2006 | Desmond et al. |
| 2007/0131870 | A1 | 6/2007 | Pang et al. |
| 2008/0217177 | A1 | 9/2008 | Inaba et al. |
| 2009/0211911 | A1 | 8/2009 | Ohura |
| 2010/0126857 | A1 | 5/2010 | Polwart |
| 2010/0140505 | A1 | 6/2010 | Pang et al. |
| 2010/0314447 | A1 | 12/2010 | Zimmermann |
| 2013/0292250 | A1 * | 11/2013 | Boeke ............. G01N 27/44791 204/601 |
| 2014/0116159 | A1 * | 5/2014 | Zimmerman ......... G01N 30/16 73/863.01 |
| 2015/0346151 | A1 | 12/2015 | Boeke et al. |
| 2016/0109406 | A1 | 4/2016 | Boeke et al. |
| 2016/0109474 | A1 | 4/2016 | Boeke et al. |

FOREIGN PATENT DOCUMENTS

| | | |
|---|---|---|
| EP | 1408328 A2 | 4/2004 |
| EP | 1530716 B1 | 5/2005 |
| JP | 69714 A | 1/1994 |
| JP | H06300690 A | 10/1994 |
| JP | 2006515428 A | 5/2006 |
| JP | 3136062 U | 10/2007 |
| JP | 2008122169 A | 5/2008 |
| WO | 9636872 A1 | 11/1996 |
| WO | 0131317 A1 | 5/2001 |
| WO | 03062810 A1 | 7/2003 |
| WO | 03072250 A3 | 9/2003 |
| WO | 2004059441 A2 | 7/2004 |

OTHER PUBLICATIONS

Applied Biosystems—by Life Technologies, http://www6.appliedbiosystems.com/products/abi3730xlspecs.cfm [retrieved from the internet on Feb. 24, 2014] pp. 2-5. Feb. 24, 2014.

Advanced Analytical Technologies, Inc., Application No. PCT/US2017/15978, "The International Search Report and the Written Opinion of the International Searching Authority, or the Declaration" dated Apr. 24, 2017, pp. 1-7. Feb. 1, 2017.

Advanced Analytical Technologies, Inc., PCT/US2018/039668 filed Jun. 27, 2018, "The International Search Report and the Written Opinion of the International Searching Authority, or the Declaration", 9 pages, dated Oct. 23, 2018.

Advanced Analytical Technologies, Inc., in connection with application 18275121.4 filed Aug. 14, 2018, "The Extended European Search Report", 9 pages, dated Feb. 6, 2019.

Advanced Analytical Technologies, Inc., in connection with application 18275121.4 filed Aug. 14, 2018, "The Partial European Search Report", 11 pages, dated Nov. 2, 2018.

Advanced Analytical Technologies, Inc., in connection with application 17733954.6 filed Feb. 1, 2017, "The Extended European Search Report", 5 pages, dated Jul. 31, 2019.

Heiger, D N., et al., Wave Form Fidelity in Pulsed-Field Capillary Electrophoresis, Anal. Chem., vol. 64, 1992, pp. 192-199.

Unknown: "Membrane Potentiometers Simplify Position Sensing", Design World, May 12, 2010 (May 12, 2010), pp. 1-2, XP055418956, Retrieved from the Internet: URL:http://www.designworldonline.com/membrane-potentiometers-simplify-position-sensing/#_ [retrieved on Oct. 25, 2017].

Magnúsdóttir et al., "Electrohydrodynamically Induced Aggregation During Constant and Pulsed Field Capillary Electrophoresis of DNA", Biopolymers, vol. 49, pp. 385-401, 1999.

Sensabaugh, G.F., "Massively Parallel DNA Typing by Capillary Array Electrophoresis", Forensic Science Group, University of California Berkeley, www.ncjrs.gov/pdffiles1/Digitization/173057NCJRS.pdf, 85 pages, 1997.

Chinese Office Action and Search Report dated Mar. 18, 2022 for application No. 201880041935.0; 9 pages.

\* cited by examiner

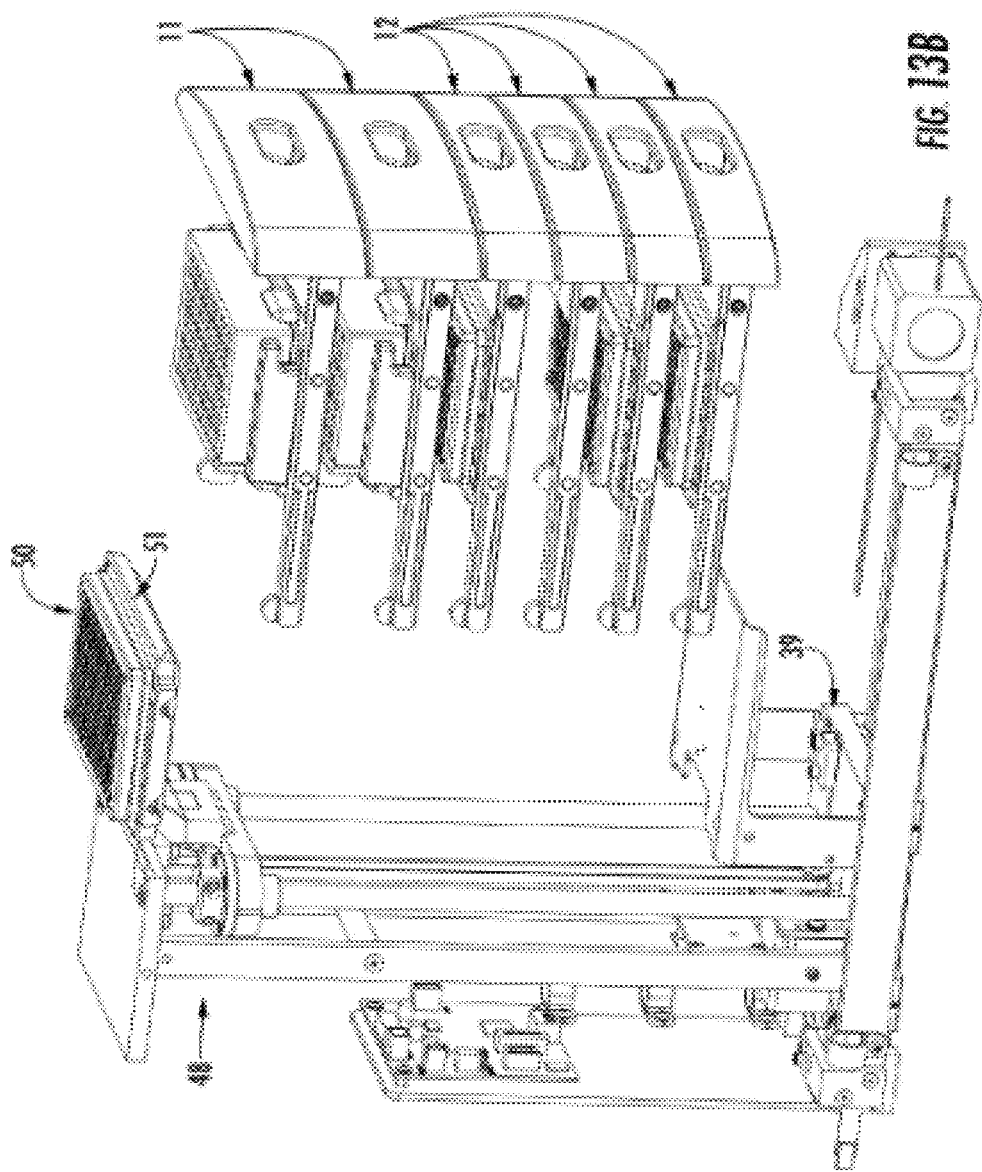

ary electrophoresis system and method. Yeung et al. in U.S. Pat. No. 5,324,401 describe a multiplex fluorescent based capillary electrophoresis system. Although these systems offer the advantage of analyzing multiple samples simultaneously, and can run several plates sequentially, they lack the ability to load or change multiple sample plates while the system is running, and they also lack a simple workflow for efficient sample analysis.

UV-ABSORBANCE MULTICHANNEL CAPILLARY ELECTROPHORESIS SYSTEM

CROSS REFERENCE TO RELATED APPLICATIONS

This application is a continuation-in-part of U.S. Ser. No. 14/822,956 filed Aug. 11, 2015, now abandoned; which is a continuation of U.S. Ser. No. 13/470,870, filed May 14, 2012, now U.S. Pat. No. 9,140,666, issued Sep. 22, 2015; which claims priority to U.S. Provisional application 61/643,411, filed May 7, 2012; and U.S. Ser. No. 13/470,870 is also a continuation-in-part of U.S. Ser. No. 29/421,549, filed Mar. 15, 2012, now U.S. Pat. No. D689,621, issued Sep. 10, 2013; all of which are herein incorporated by reference in their entirety.

BACKGROUND OF THE INVENTION

Field of the Invention

This invention relates to a system for multi-channel capillary electrophoresis.

Description of Related Art

The current next-generation sequencing (NGS) platforms use a variety of technologies for sequencing, including pyrosequencing, ion-sequencing, sequencing by synthesis, or sequencing by ligation. Although these technologies have some minor variations, they all have a generally common DNA library preparation procedure, which includes genomic DNA quality & quality assessment, DNA fragmentation and sizing (involving mechanical shearing, sonication, nebulization, or enzyme digestion), DNA repair and end polishing, and a last step of platform-specific adaptor ligation. With a rapidly growing demand for DNA sequence information, there is a critical need to reduce the time required for the preparation of DNA libraries.

A labor-intensive step in DNA library preparation is the qualification (size determination) and quantification of both un-sheared genomic DNA and downstream fragmented DNA. Existing methods for DNA fragment analysis include agarose gel electrophoresis, capillary electrophoresis, and chip-based electrophoresis. Agarose gel electrophoresis is labor intensive, requiring gel preparation, sample transfer via pipetting, and image analysis. The images obtained by agarose electrophoresis are often distorted, resulting in questionable or unreliable data. It is impossible to use agarose gel electrophoresis for accurate quantification of DNA, which means that a separate, second method (UV or fluorescence spectroscopy) is required for quantification. Finally, agarose gel electrophoresis is difficult to automate. Chip or microchip based electrophoresis provides an improvement in data quality over agarose gel electrophoresis but is still labor intensive. For example, chip-based methods require manual steps to load gel, markers and samples. Even though these microchip or chip based electrophoresis units can run a single sample in seconds or minutes, the sample and gel loading are barriers to ease-of-use, especially when running hundreds or thousands of samples. Also, existing chip-based systems are unable to quantify genomic DNA. Capillary electrophoresis (CE) offers advantages over both agarose electrophoresis and microchip electrophoresis in that gel-fill and sample loading is automated.

Multiplex capillary electrophoresis is known. For example, Kennedy and Kurt in U.S. Pat. No. 6,833,062 describe a multiplex absorbance based capillary electrophoresis system and method. Yeung et al. in U.S. Pat. No. 5,324,401 describe a multiplex fluorescent based capillary electrophoresis system. Although these systems offer the advantage of analyzing multiple samples simultaneously, and can run several plates sequentially, they lack the ability to load or change multiple sample plates while the system is running, and they also lack a simple workflow for efficient sample analysis.

While existing commercial CE systems can be automated with a robotic system, stand-alone systems are not fully automated or lack the sensitivity and data quality required for adequate DNA library analysis. An example of a CE instrument with a robot-capable interface is given by Kurt et al. in U.S. Pat. No. 7,118,659. For the construction of DNA libraries, as well as other applications such as mutation detection, it is often necessary to run thousands of samples per day, but the implementation of a robotic system for sample handling is prohibitively expensive, and many labs lack the expertise necessary for the maintenance and operation of sophisticated robotic systems. Automated forms of micro-slab-gel electrophoresis have been developed, such as those described in United States Patent Application number 20100126857. These allow for automatic analysis of multiple samples, but the techniques either still require significant human intervention, or they do not have the throughput required for high-volume applications. Amirkhanian et al. in U.S. Pat. No. 6,828,567 describe a 12-channel multiplex capillary electrophoresis system capable of measuring up 12 samples at a time using multiplex capillary electrophoresis. However, this system is not capable of measuring multiple 96-well plates, and does not have the workflow that allows the analysis of thousands of samples per day.

As can be seen, there a need for an automated capillary electrophoresis system that a) eliminates the complexity, cost, and required expertise of a robotic system b) enables users to run from one to several thousand samples per day and c) allows users to conveniently load several plates or samples onto a capillary electrophoresis system while the system is running other samples and d) has the small size and footprint of a stand-alone capillary electrophoresis unit.

This invention has as a primary objective the fulfillment of the above described needs.

BRIEF SUMMARY OF THE INVENTION

The present invention is an ultraviolet light absorbance-based multiplex capillary electrophoresis system and console with an improved sample handling and control method for the analysis of samples.

One embodiment of the invention is a console with a series of at least four and preferably at least six vertically stacked user-accessible drawers that can each hold a plate containing from 1 to 384 sample wells. Preferably, each user accessible drawer holds a sample plate containing 96 sample wells. The system is configured so that sample plates can be loaded onto the system at any time, including during the electrophoresis or analysis of samples. User "A" can walk up to the machine, load a row of 12 samples, enter loading and analysis instructions onto the computer and walk away. While user "A" samples are running, user "B" can walk up to the machine, load a tray of 96 samples, enter loading and analysis instructions and walk away. User "C" can walk up to the machine, load 12 samples, while either user "A" or user "B" samples are running, enter loading and analysis instructions, and walk away. Two of the preferred six user-accessible drawers are used to hold an electrophoresis run buffer and a waste tray.

Another embodiment of the invention is a mechanical stage that transports sample trays and/or buffer or waste trays from any one of the vertically stacked user-accessible drawers to the injection electrodes and capillary tips of the multiplex capillary array of the capillary electrophoresis subsystem.

Another embodiment of the invention uses a computer program that enables a user to create a queue of jobs, with each job representing an analysis of a new set of samples. This computer system enables users to enter job data even when the system is running samples. For example, user "A" loads "sample plate 1" into the system into Drawer 3 and uses a computer program to add a job to a queue, the job representing the injection and capillary electrophoresis of samples in "sample plate 1" in Drawer 3. While the system is running user A's samples, user B loads plate 2 into Drawer 4 and uses the same computer program to add a job to a queue, the job representing the injection and capillary electrophoresis of samples in "sample plate 2" in Drawer 4. User C loads "sample plate 3" into Drawer 5 and uses the same computer program to add a job to the queue, the job representing the injection and capillary electrophoresis of samples in "sample plate 3" in Drawer 5.

Another embodiment of the invention is an ultraviolet absorbance based capillary electrophoresis system comprising a console housing an operable multiplexed capillary electrophoresis system; a capillary array containing at least 12 capillaries; a UV light source; a first enclosure covering said UV light source, wherein said first enclosure contains a slit; and a second enclosure covering said first enclosure, a collimating lens, and capillary window of said capillary array.

Yet another embodiment of the invention is a capillary electrophoresis system comprising a console housing an operable multiplexed capillary electrophoresis system and a reservoir containing a flow channel for passing a conductive fluid past the capillary tips of a capillary array and a second, separate channel for passing the same conductive fluid past an electrode.

BRIEF DESCRIPTION OF THE DRAWINGS

FIG. 13B shows a view of the x-z stage with a sample tray lifted.

DETAILED DESCRIPTION OF THE INVENTION

The invention is a multiplexed capillary electrophoresis system with enhanced workflow. The capillary electrophoresis system and apparatus of the present invention includes an absorbance or fluorescence-based capillary electrophoresis sub-system with a light source, a method for carrying light from the light source to the sample windows of a multiplex capillary array containing at least 12 capillaries (preferably 96 capillaries), and a method for detecting light emitted (fluorescence) or absorbed (absorbance) from the sample windows of a multiplex array. The sub-system also includes a method for pumping buffers and gels through the capillaries, as well as a method for application of an electric field for electrophoretic separation. The optics of the fluorescent-based sub system of the present invention are described by Pang in United States Patent Applications 20070131870 and 20100140505, herein incorporated by reference in their entirety. The optics of an applicable absorbance-based system, as well as the fluid handling, reservoir venting, application of electric field, and selection of fluids via a syringe pump and a 6-way distribution valve are discussed by Kennedy et al. in U.S. Pat. Nos. 7,534,335 and 6,833,062, herein incorporated by reference their entirety.

Figure 1:
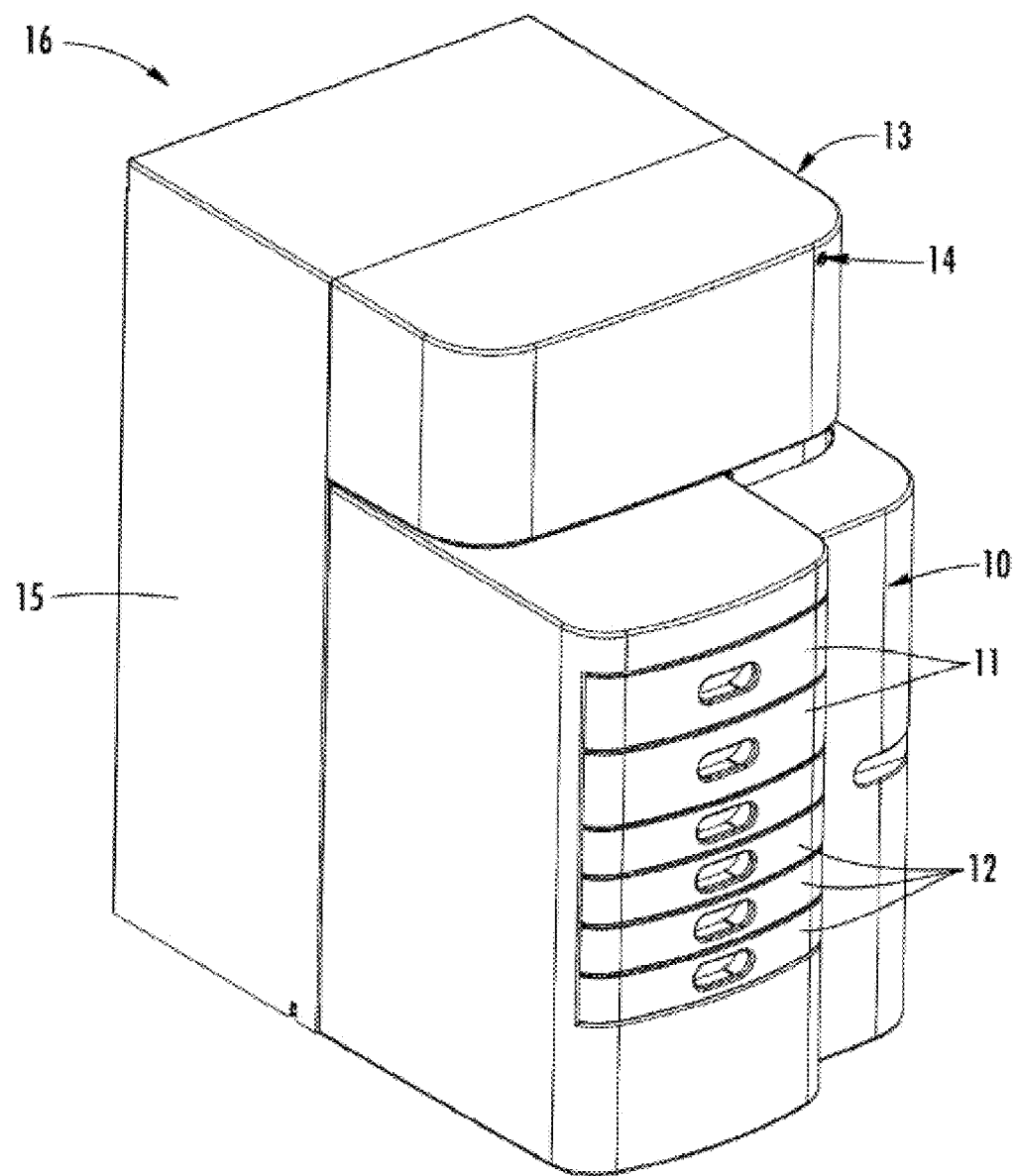
FIG. 1 shows a left-front-view of the instrument, with 6 drawers for holding sample and buffer plates.

Referring to FIG. 1 the multiplex capillary system (or unit or instrument) and/or console 16, with enhanced workflow has a door 10 for easy access to the loading of gels, two drawers 11 for the easy loading of a buffer tray and a waste tray. Drawers 12 can be opened for easy loading of 96-well PCR plates, tube strips, vials, or other sample containers. A top door 13 can be opened to access a replaceable capillary array, array window, and capillary reservoir. An indicator light 14 is used to for notifying users of the active application of a high-voltage for electrophoresis. A removable back-panel 15 allows access to electronics such as a high-voltage power supply, electrical communication panels, a pump board, pressure transducer board, and stage driver electronics. The back panel 15 also allows maintenance access to the x-z stage, which is used to move sample trays from the drawers 11 and 12 to a capillary array.

Figure 2:
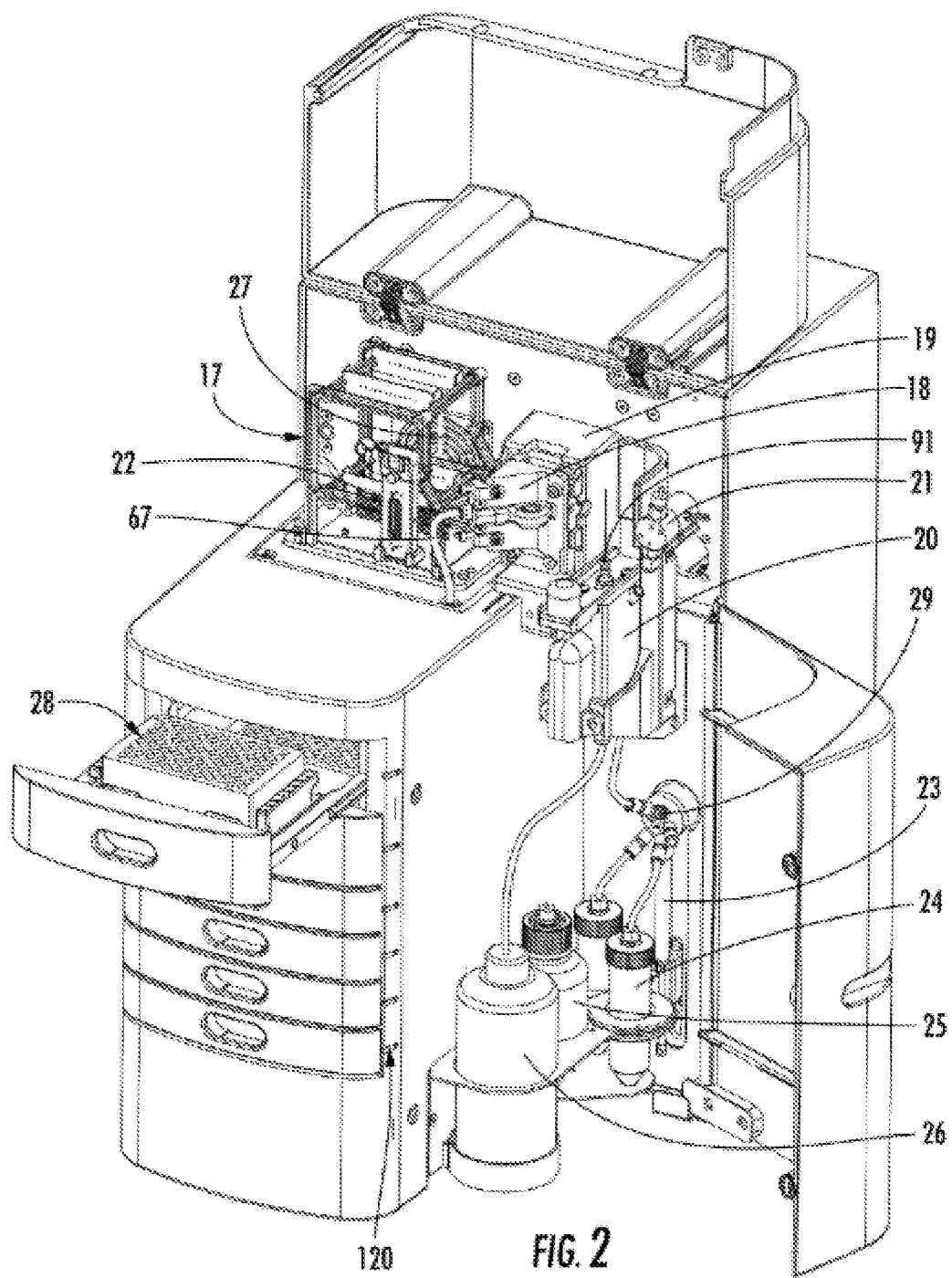
FIG. 2 shows a right-front view of the instrument with one drawer pulled out for placement of a buffer plate and the top and side door compartments open.

FIG. 2 shows the multiplex capillary system used with the enhanced workflow console 16 of FIG. 1 with the top and side doors open. A replaceable capillary array (cartridge) 17 holds either 12 or 96 capillaries for multiplex capillary electrophoresis. An LED light guide 67 guides light from a LED engine located in the back compartment to the array window block 22 which is inserted between the array window holder 19 and LED light guide and window holder 18. In this view, array window block 22 is attached to the capillary array 17 for display. When the capillary array 17 is removed from the system 16, the array window block 22 can be attached to the capillary array 17 (as shown). When the capillary array 17 is fully installed, the array window block 22 is not visible because it is sandwiched between the array window holder 19 and LED light guide and window holder 18. A vent valve 21 is connected to the top of a capillary reservoir 20. A syringe pump 23 coupled with a 6-way distribution valve 29 delivers fluids and electrophoresis gels from fluid containers 24 and 25 into the capillary reservoir 20, waste container 26, or capillaries in the capillary array 17. A fan 27 is used for forcing cool air from the back compartment through the capillary array 17, past the outside of the capillary reservoir 20, down past the fluid containers 24, 25 and finally out the bottom of the instrument. LED indicator lights 120 are used to indicate the presence or absence of trays in the drawers. A buffer tray 28 is shown in a drawer (11, FIG. 1). The capillary array reservoir tip 91 is shown inserted into the capillary reservoir 20.

The concepts and practical implementation of motion control systems are known. For example, Sabonovic and Ohnishi; "Motion Control" John Wiley and Sons, 2011, herein incorporated by reference in its entirety, discusses practical methods for the design and implementation of motion control. It does not, however, show an enhanced CE workflow console 16 as depicted here.

Figure 3:
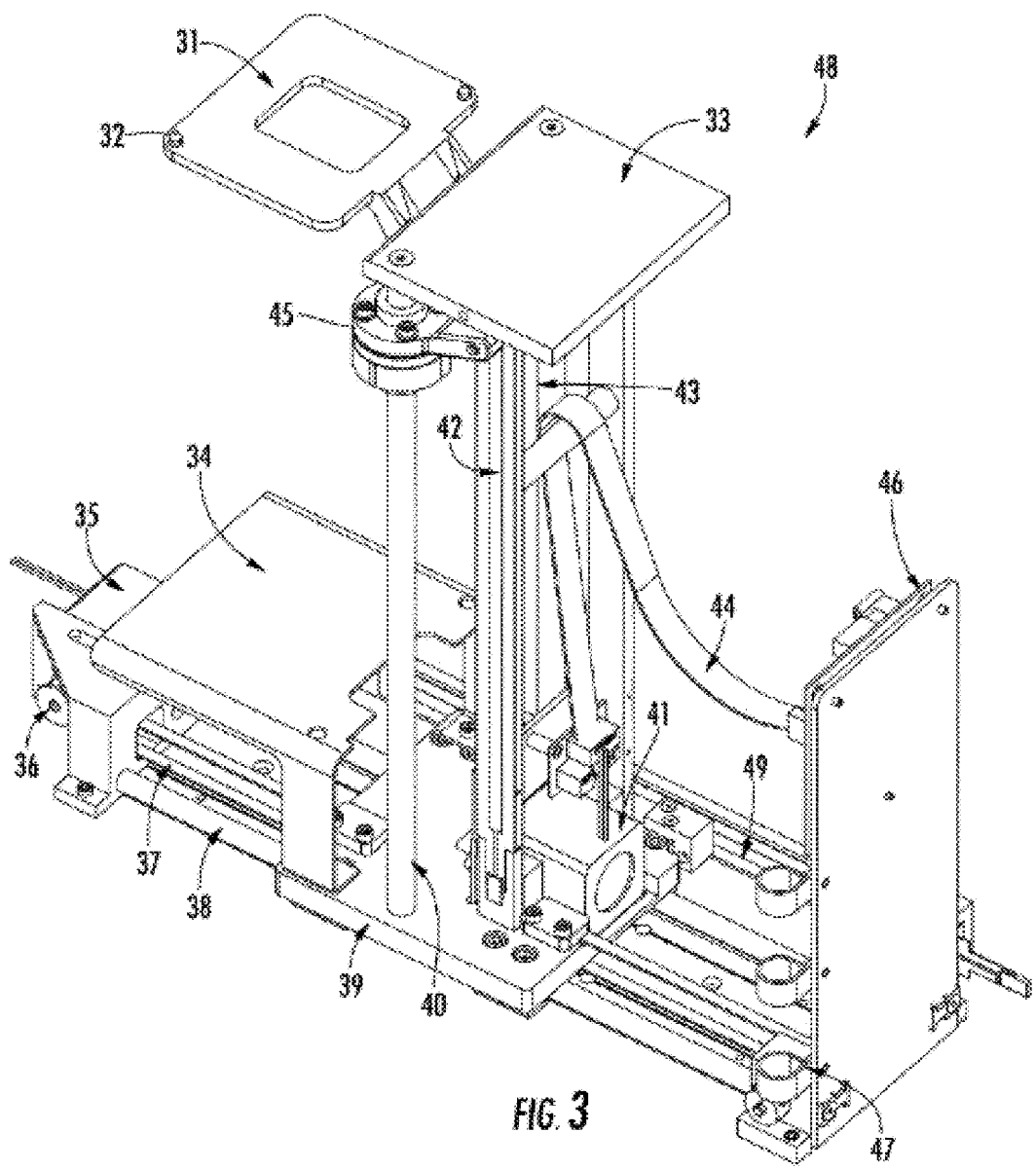
FIG. 3 shows the x-z stage assembly.
Figure 8:
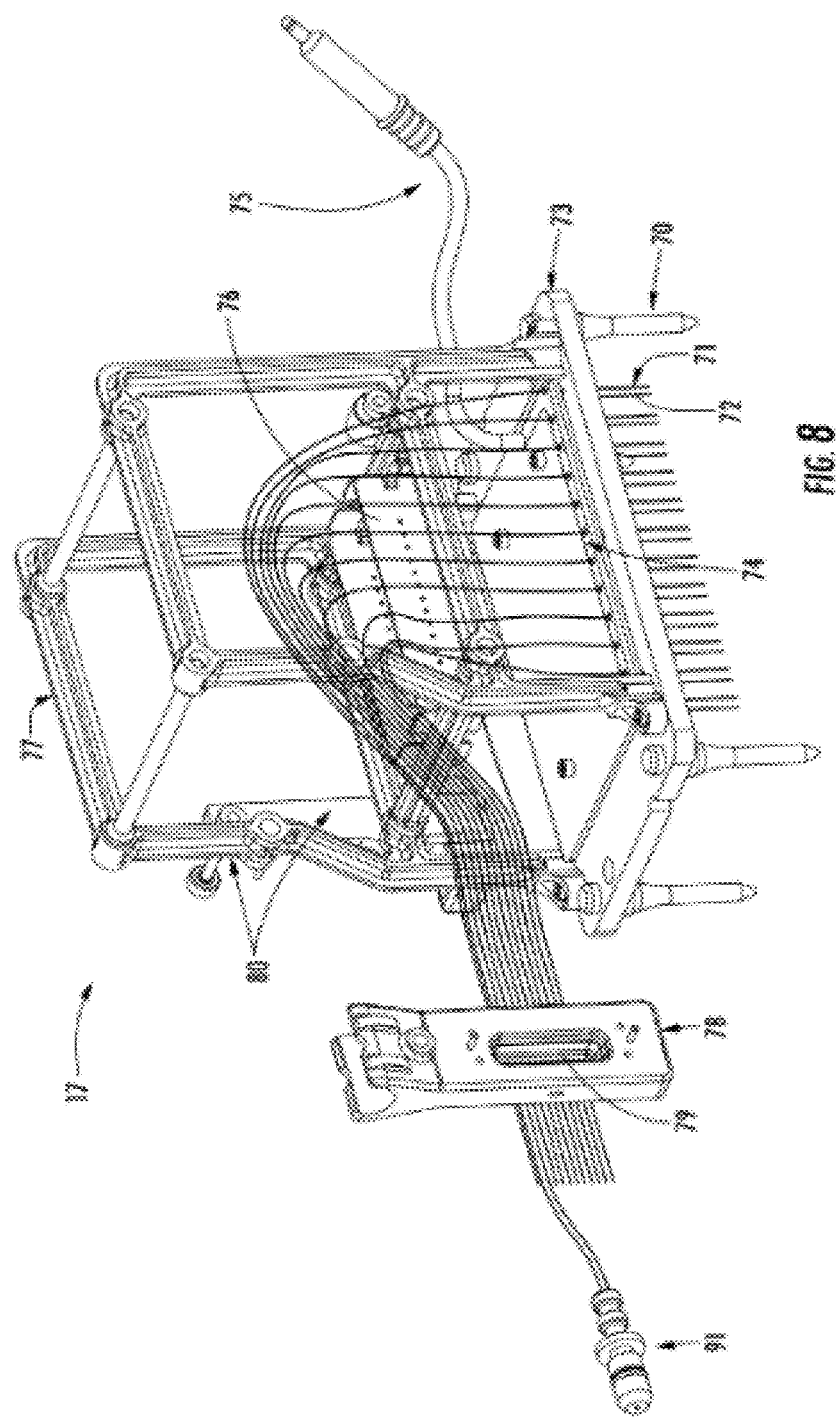
FIG. 8 shows a capillary array cartridge.

FIG. 3 shows the x-z stage assembly 48, which is used to transport sample plates or trays (50, FIG. 4) and associated tray holders (51, FIG. 4) from the drawers (12 FIG. 1) to the injection capillaries (72, FIG. 8) and injection electrodes (71, FIG. 8) of the capillary array (17, FIG. 8). The x-z stage assembly 48 is also used to position a buffer tray or waste tray (28, FIG. 2) from the drawers (11, FIG. 1) to the injection capillaries 72 and injection electrodes 17 of the capillary array 17 (FIG. 8). The x-z stage assembly 48 has a tray carrier 31 with alignment pins 32, which align with holes (57, FIG. 5) on the bottom of the tray holder (51, FIG. 4) to prevent subsequent sliding or movement of the tray holders 51 during transport. A protective cover 34, made of metal or plastic, is used to prevent gels or other liquids from spilling onto the x-direction guide rails 38 and x-direction drive belt 37 of the x-z stage assembly 48. An x-drive stepper motor 35 is used as the electro-mechanical driver for motion in the x-direction. A drive pulley 36 is attached to the stepper motor 35 and x-direction drive belt 37 which drives the stage carrier 39 back-and forth along the guide-bars 38. A second drive pulley (not shown) is used on belt 37 towards the back-end of the stage, which allows the belt 37 to make a full loop when affixed to stage carrier 39. Any motor-induced movement of the belt 37 induces an x-direction movement of the stage carrier 39 on the guide rails 38. A stepper-motor for the z-position is located at 41, which is attached to a drive pulley/belt configuration similar to that shown in the x-direction. The z-direction drive belt is shown as 43. The z-position motor/pulley/belt is used to move the tray carrier 31 up and down the guide bars 40. Top plate 33 serves as a structural support for the guide bars 40. An electrical communication strip 44 is used to communicate between an electrical motor control board 46 and the stepper motors 41 and 35. An x-direction membrane potentiometer strip 49, along with appropriate control electronics, is used to determine and control the absolute position of the stage carrier 39 in the x-direction. A z-direction membrane potentiometer strip 42, along with appropriate control electronics, is used to determine the absolute position of the tray carrier 31 in the z-direction. Linear encoders or rotational encoders (on the stepper motor 35, 41) are alternative forms of positional measurement and control. Bearings 45 are located on each guide bar 40 and guide rail 38 to enable friction-free movement of both the tray carrier 31 and the stage carrier 39. Note that there are two guide bars 40 or guide rails 38 per axis. Electrical cord guide straps 47 are attached to a back support, which also holds the electrical control board 46 for the x-z stage assembly 48.

Figure 4:
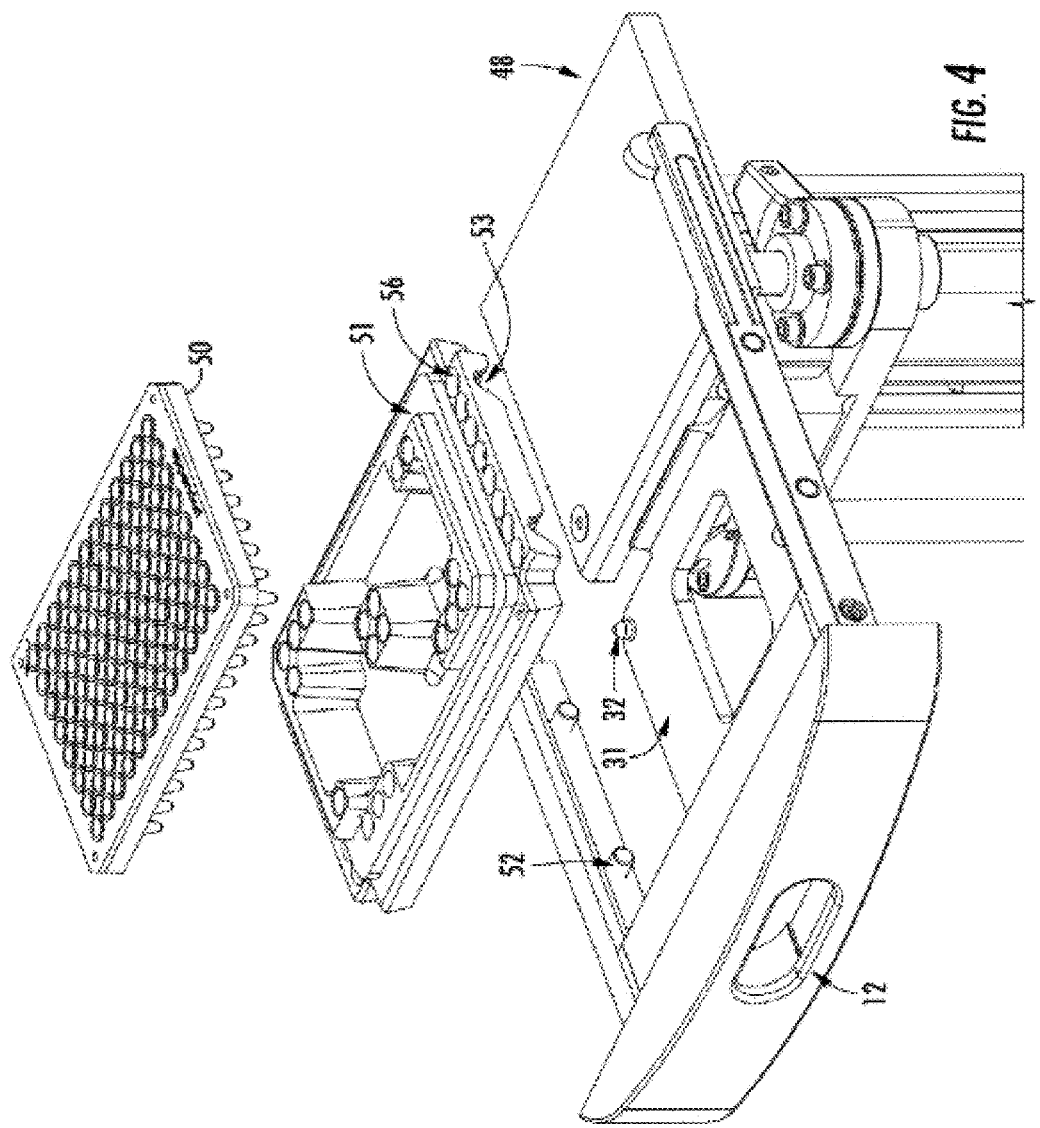
FIG. 4 shows a drawer, stage assembly, tray holder, and sample plate.
Figure 5:
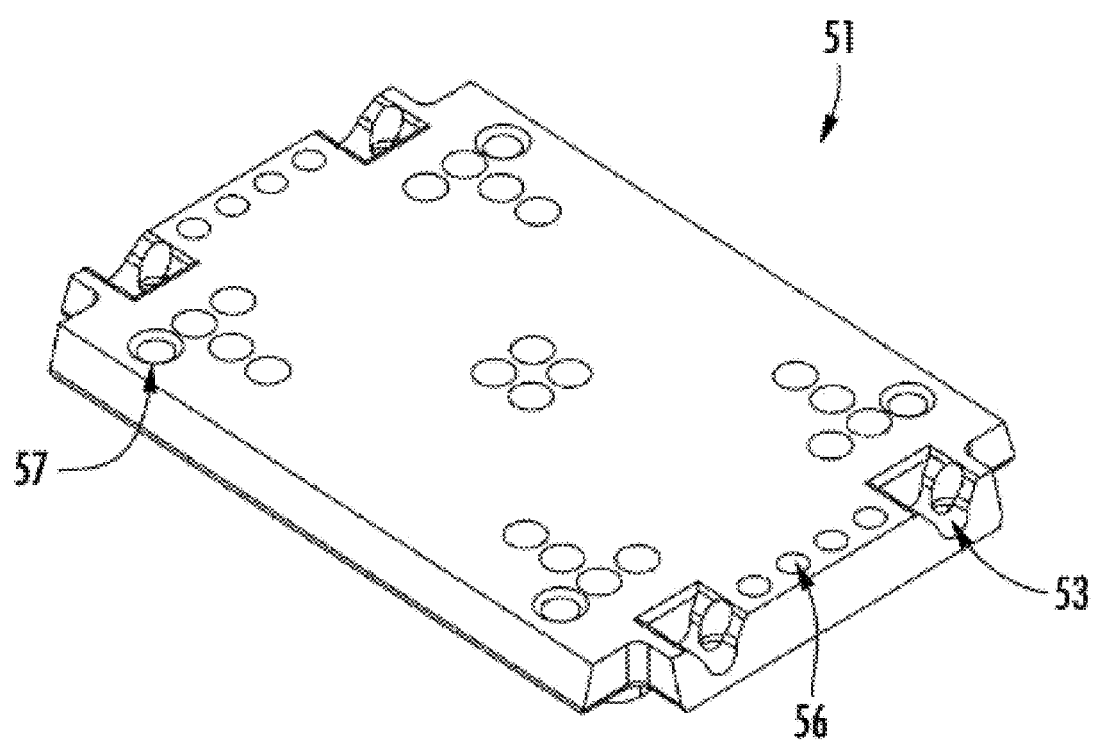
FIG. 5 shows the bottom of a tray holder.

FIG. 4 shows a drawer 12, superimposed on an image of the x-z stage assembly 48, tray holder 51, and 96-well sample tray 50. The tray holder 51 is molded to specifically hold a 96-well plate, shown here as 50. Alternative moldings of the tray holder 51 allow for different sample plates. Holes (57, FIG. 5) on the bottom of the tray holder 51 align with the alignment pins 32 of the tray carrier (31 FIG. 4). Notches 53 in the tray holder 51 align with alignment pins 52 on the drawer 12 to enable the tray holder 51 to fit in a tight, reproducible way within the sample drawer 12.

Figure 6:
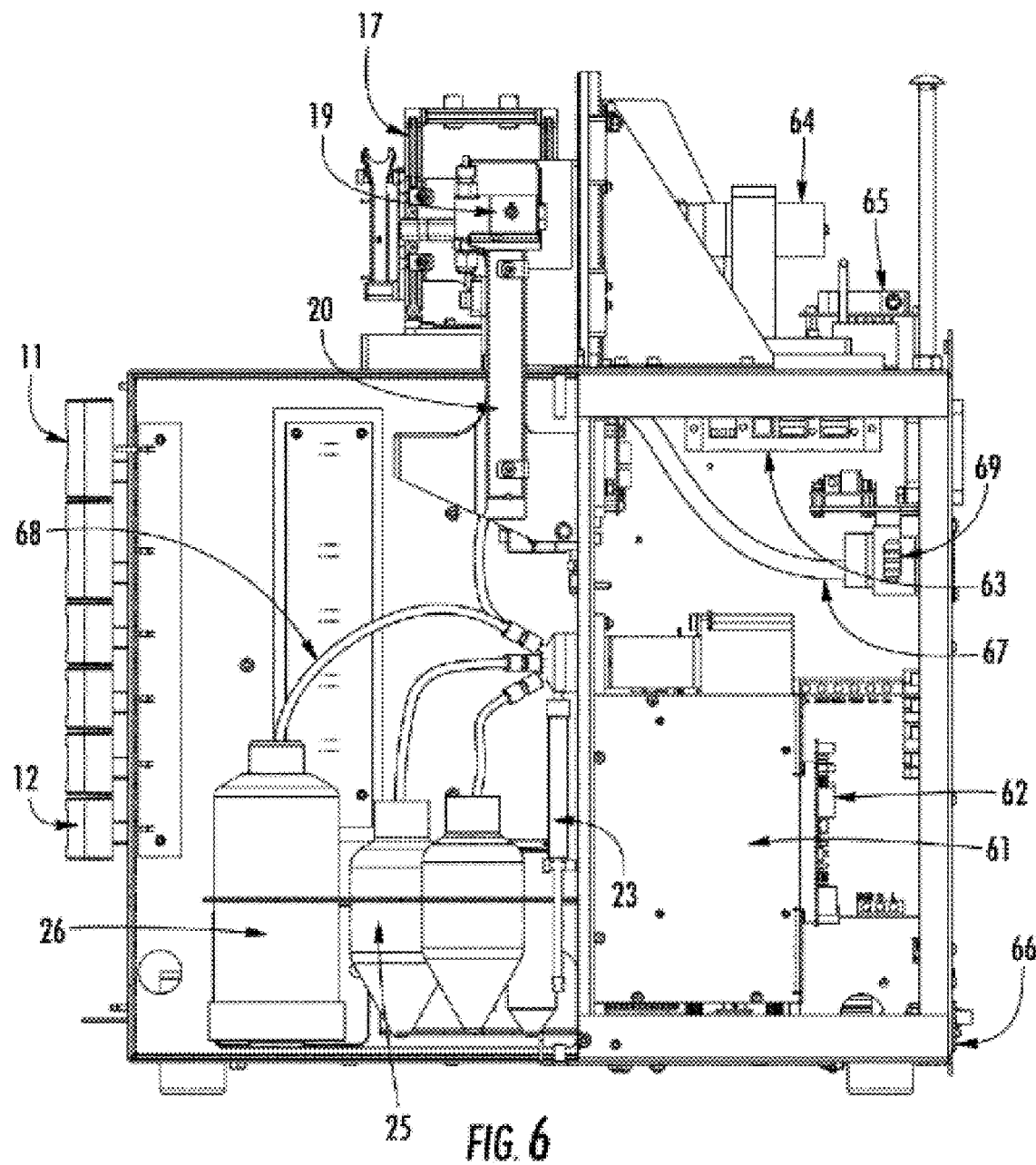
FIG. 6 shows a right-side view of the instrument without the cover.

FIG. 6 Shows a right-side view of the electrophoresis system, with a chassis 66, pump motor and control system 61, pump control board 62, LED light engine 69, LED light line 67, high voltage power supply board 65, capable of applying 0.0 kV to 15 kV across the electrodes of the capillary array 17, a CCD camera 64, capillary array cartridge 17, array window holder 19, capillary reservoir 20, drawers 11, drawers 12, fluid lines 68, waste container 26, gel containers 25 and syringe 23. A USB electronic distribution board is shown as 63.

Figure 7:
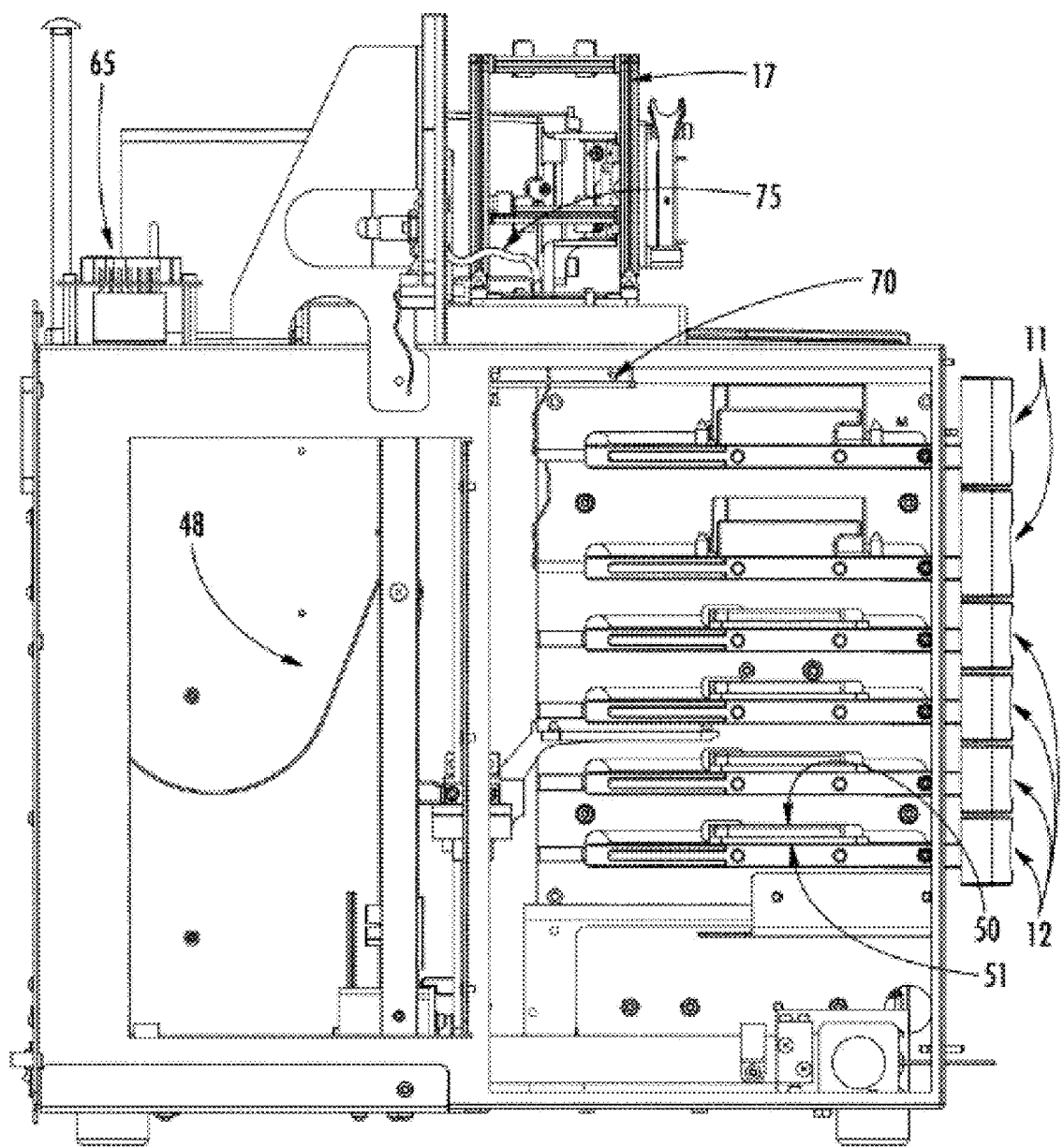
FIG. 7 shows the left-side view of the instrument without the cover.

FIG. 7 shows a left side-view of the electrophoresis unit 16 showing the x-z stage assembly 48, which moves tray holders 51 and sample trays or plates 50 from a drawer 12 or 11 to the bottom of the capillary array 17. The stage unit 48 can move the sample tray holder 51 and sample tray 50 up in the z-direction to lift the tray holder/sample tray off of the drawer 12 (or 11), move back in the x-direction away from the sample drawers 12, and then move the sample plate 50 up in the z-direction to the bottom of the capillary array 17. After electrokinetic or hydrodynamic injection, the stage unit 48 can move the sample tray holder/sample tray back down to the target drawer position (down in the z-direction), move forward in the x-direction just above the sample plate 50, and then drop down in the z-direction to set the sample tray holder/sample tray onto the drawer 12. When the sample tray holder 51 is resting in a drawer 12, the back edge of the sample tray holder 51 and sample tray 50 are aligned so that they do not lie directly underneath the capillary array 17. This allows the sample stage tray carrier (31, FIG. 3) to move up and down along the entire z-axis with a tray holder/sample tray without colliding into other tray holders/sample trays in the drawers 12. The alignment pins (70, FIG. 8) on the bottom of the capillary array 17 are used to align the tray holder 51 with a sample tray 50 so that the capillary and electrode tips (the tips of the injection capillaries 72 and the injection electrodes 71) dip into each sample well of the sample plate 50 and do not collide with other areas of the sample plate 50. This is shown in more detail in FIG. 11, which shows a sample tray holder 51 with a sample tray 50 aligned underneath a capillary array 17. Alignment holes 56 on the tray holder 51 force the alignment of the tray holder 51 with the capillary array alignment pins 70.

FIG. 7 also shows high voltage power supply board 65 and high voltage power supply cable 75 (to the capillary array 17).

FIG. 8 shows a capillary array cartridge 17, with rigid plastic support structure 77, window storage and transport screw 80, capillary support cards 76, high voltage power supply cable 75, and insulating support structure or load header 73 onto which the electric circuit board 74 is placed. Electrodes 71 protrude through the electric circuit board 74, through the insulating support structure or load header 73, and protrude through the bottom of the capillary array 17. The electrode material is stainless steel or tungsten. The electrode dimension, which is not a critical aspect of the invention, is 50 mm length times 0.29 mm diameter. The protrusion from the bottom of the cartridge base is 20.0 mm. The electrodes 71 are soldered onto the circuit board 74. The high voltage power supply cable 75 is also soldered to the same circuit of the electrical circuit board 74, which enables contact of the electrodes 71 with the high voltage power supply (65, FIG. 6). Capillary tips (the tips of the injection capillaries 72) are threaded through the electric circuit board 74 and insulated support structure or load header 73 and are aligned immediately adjacent and parallel to the electrode tips (the tips of the injection electrodes 71). The distance between the capillary tips and electrode tips are from 0.1 mm to 4 mm. The ends of the capillary tips and the ends of the electrode tips lie in a single plane (i.e. the capillary tips and electrode tips are the substantially the same length, with length variation of no more than about +/−1 mm). Preferably, the length variation of capillary tips and electrode tips is less than 0.5 mm. The capillaries 72 thread through the bottom of the capillary array 17, through the insulating support structure or load header 73, through the electric circuit board 74, through the capillary support cards 76 (which are supported by the rigid plastic support structure 77) through the capillary window holder 78 with capillary windows 79 centered in the opening of the window holder 78, and then finally through the capillary reservoir tip 91, in which all capillaries 72 (in this case 12) are threaded through a single hole. For 96 capillary arrays 17, capillaries 72 are threaded in groups of 12, 8, 4, or 2, (preferably 4) in the capillary reservoir tip 91. The capillaries 72 are held in place in the capillary reservoir tip 91 with an adhesive, such as a thermally or UV-curable epoxy. The tips of the capillaries 72 located at the capillary reservoir tip 91 may be referred to as first capillary tips, and the tips of the capillaries 72 located at the electrodes 71 (at the ends of the capillaries 72 opposite to the first capillary tips and capillary reservoir tip 91) may be referred to as second capillary tips.

Figure 12A:
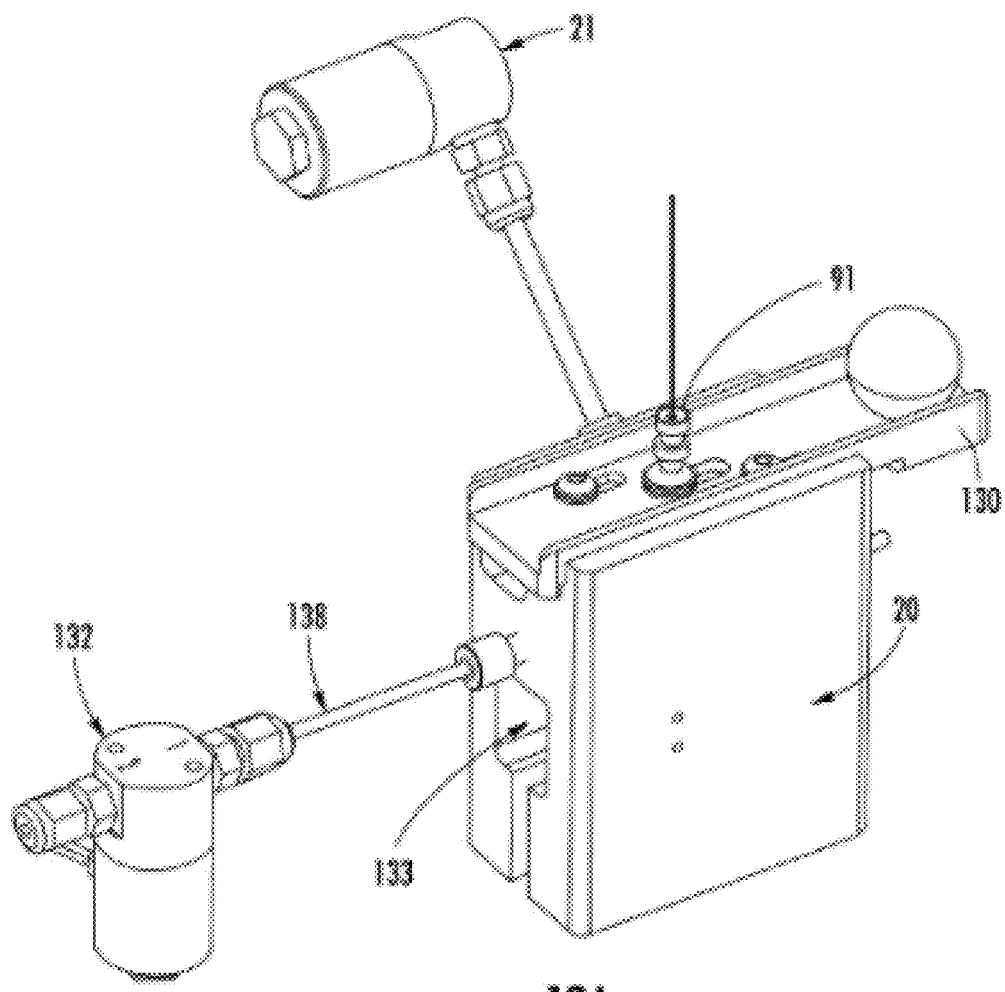
FIG. 12A shows a view of the capillary electrophoresis reservoir system.

FIG. 12A shows the capillary reservoir 20, with a reservoir body (indicated by the arrow of 20), capillary reservoir tip 91, slider bar 130 (for locking capillary reservoir tip 91 into the capillary reservoir 20, through alignment of a notch on the capillary reservoir tip 91 and the slider bar 130), vent block valve 21, waste tube out 138, waste block valve 132, and pressure transducer cavity 133.

Figure 12B:
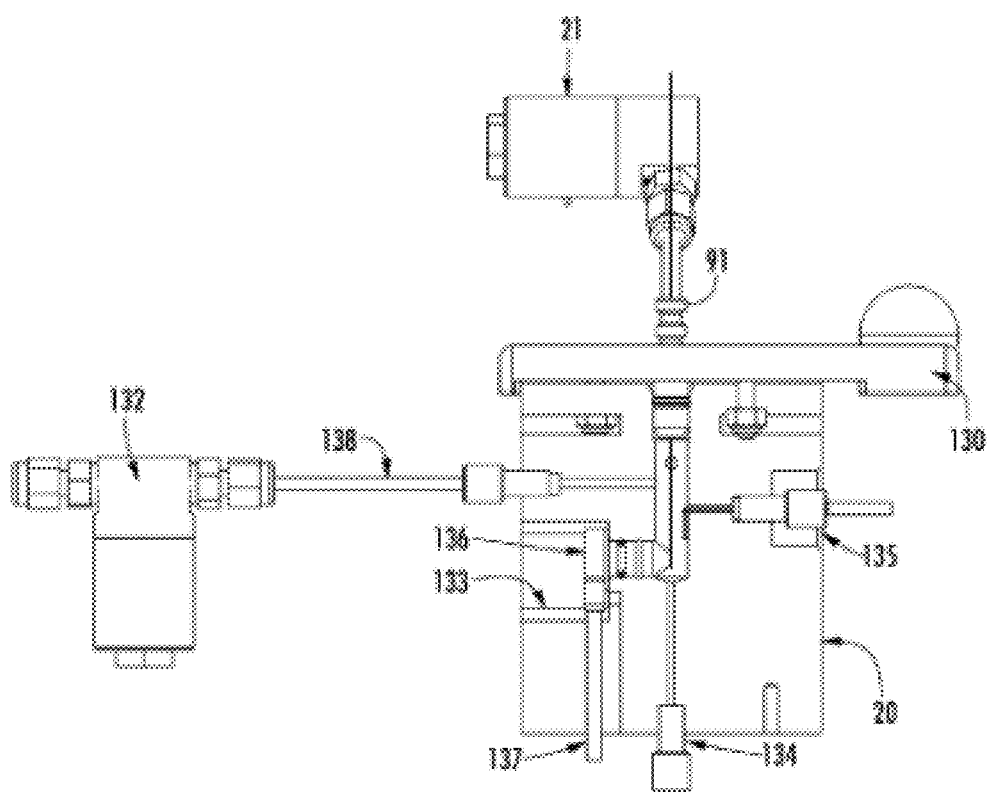
FIG. 12B shows a view of the capillary electrophoresis reservoir system.

FIG. 12B shows an alternate cut-out view of the capillary reservoir 20, with the reservoir body, capillary reservoir tip 91, slider bar 130, vent block valve 21, waste tube out 138, waste block valve 132, electrode for attachment to ground (or ground electrode) 135, pressure transducer cavity 133, pressure transducer 136, pressure transducer cable for attachment to analog/digital board 137, and fluid tube input 134 (from syringe pump 23, FIG. 2).

The reservoir body of the capillary reservoir 20 can be made of any solid material such as acrylic, Teflon, PETE, aluminum, polyethylene, ABS, or other common metals or plastics. The key criterion is that the material is durable and chemically resistant to the materials used. A preferred material is acrylic or Teflon.

Figure 11:
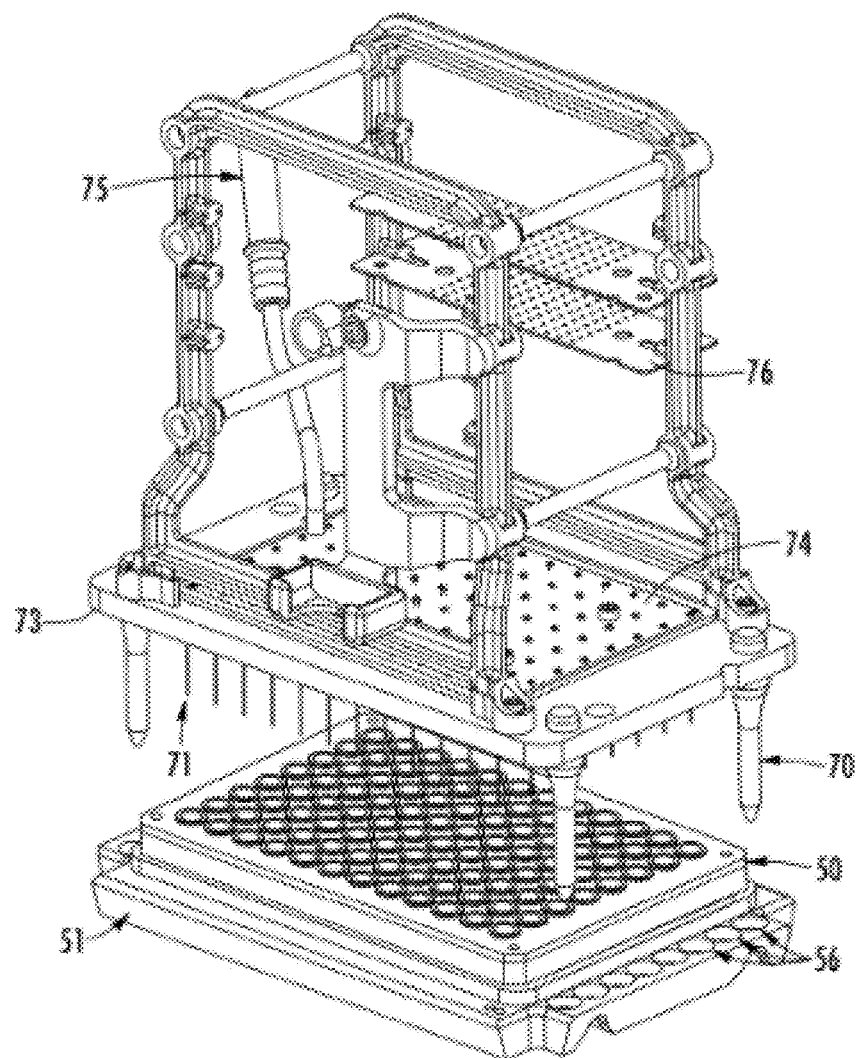
FIG. 11 shows the positioning of a sample plate under the array by the stage.
Figure 13A:
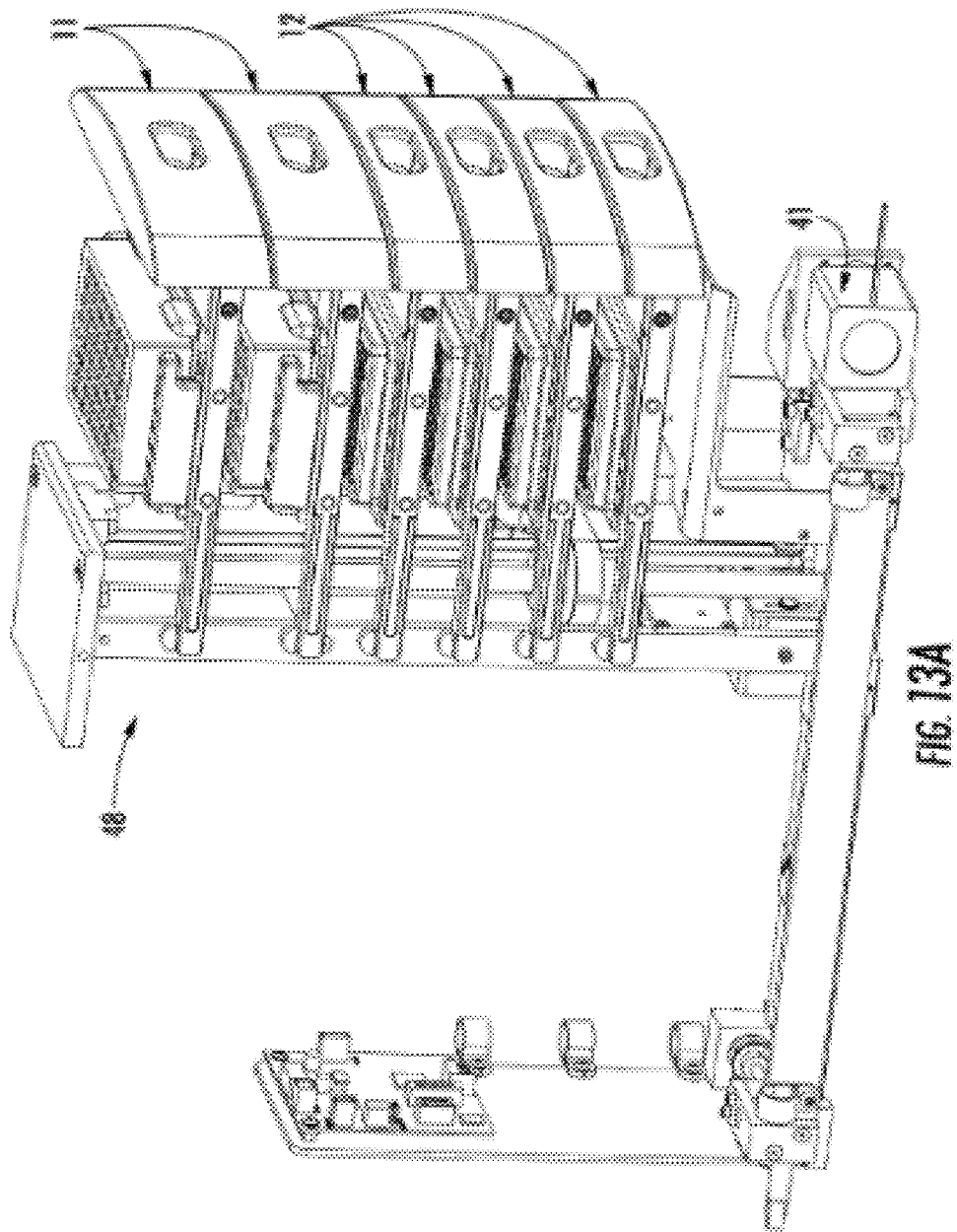
FIG. 13A shows a view of the x-z stage relative to the drawers.

FIG. 13A shows the x-z stage unit 48 in relation to the drawers 11 and 12. The x-z stage is located directly behind the drawers 11 and 12, and can move the stage carrier (39, FIG. 13B) back-and forth in the x-direction using the stepper-motor for the x-position (35, FIG. 3). A sample tray 50 is removed from a drawer 12 (or 11) by first moving the stage forward, towards the drawers 11 and 12, in the x-direction. The tray carrier (31, FIG. 3) lifts a tray holder up 51 and off a drawer 12 in the z-direction using the z-direction stepper motor (41, FIG. 3). The stage carrier 39 is then moved back in the x-direction, away from the drawers 11 and 12, as shown in FIG. 13B. The stage carrier 39 is then moved up in the z-direction to move the tray holder 51 and sample tray 50 to the injection position of the capillary array 17 (FIG. 11).

A typical strategy for pumping fluids for capillary electrophoresis is as follows. Consider the following 6 positions of the six-way distribution valve (29, FIG. 2) on the syringe pump 23. Position 1 is connected to the bottom of the capillary reservoir 20 (fluid tube input 134, FIG. 12B); position 2 is connected through a tube to a bottle of conditioning fluid (a fluid for conditioning the walls of the capillaries 72); position 3 is connected to a "Gel 1" which is used for the analysis of genomic DNA, position 4 is connected to a "Gel 2" which is used for the analysis of fragmented DNA, position 5 is unused, and position 6 is connected to the waste bottle 26.

Step A: The capillary reservoir 20 is first emptied by opening position 1 (reservoir), filling the syringe 23 with fluid that is in the capillary reservoir 20, closing position 1, opening position 6, and emptying fluid to the waste (waste container 26). This is repeated until the capillary reservoir 20 is empty. Block valves 21 and 132 are kept open during this process to enable efficient draining of the capillary reservoir 20.

Step B: The capillary reservoir 20 is then filled with conditioning solution by opening position 2, filling the syringe 23 with conditioning solution, closing position 2, opening position 1, and filling the capillary reservoir 20 with conditioning solution. Block valve 21 is closed, but block valve 132 to waste (waste container 26) is open, enabling the over-filling of the capillary reservoir 20 with conditioning solution.

Step C: The capillaries 72 are filled by closing both vent block valve 21 and waste vent valve 132. The syringe 23 is filled with capillary conditioning solution. Position 1 is opened, and fluid is pressure filled through the capillaries 72 at a minimum of 100 psi for a pre-determined time, which may range from 1 minute to 20 minutes.

Step D: The capillary reservoir 20 is emptied by step A, and then re-filled with gel using the same process as in Step B, except that position 3 for the gel is used on the 6-way distribution valve 29.

Step E: The capillaries 72 are filled with gel using a process analogous to Step C.

After steps A-E, the capillaries 72 are ready for electrophoresis.

A general strategy and process for analyzing samples using electrophoresis is as follows.

Samples are placed into a 96-well plate (sample tray or plate 50) for analysis. The user places the sample plate 50 into a sample drawer (12, FIG. 1), and then adds jobs to a computer-based queue, corresponding to the analysis of a specific row or the entire sample plate 50 in the drawer 12. The computer, which is the control system of the instrument, executes the analysis of the row or entire sample tray 50 of interest.

A key embodiment of the invention is the workflow of the capillary electrophoresis system 16. Drawers (11, FIG. 1) allow easy placement of buffer and waste trays 28 into the system 16. Drawers (12, FIG. 1) allow easy placement of sample trays 50 into the system 16. Of particular importance is the ability to place or remove sample trays 50 from drawers (12, FIG. 1) while the system 16 is performing capillary electrophoresis. Indicator lights (120, FIG. 1) show if a tray 28, 50 is present or absent in a drawer 11, 12, which let users know if a drawer 11, 12 is in place. A typical workflow for a 12-capillary multiplex system is as follows: User A walks up to the machine with sample tray 1, and places it into the third drawer from the top (one of drawers 12, FIG. 1). User "A" then fills a queue with three jobs, which correspond to performing capillary electrophoresis on the three rows of samples: sample tray 1 row A, sample tray 1 row B, and sample tray 1 row C. User "A" then instructs the computer to execute the queue, and as a result, the system begins capillary electrophoresis of sample tray 1, row A, and will continue executing jobs in the queue until there are no more jobs. User "B" then comes up and places sample tray 2 into the fourth drawer from the top (one of drawers 12, FIG. 1). User "B" then adds 8 jobs to the queue corresponding the performing of capillary electrophoresis on 8 rows of samples: sample tray 2, rows A-H. The computer will continue analyzing user "A" samples until they are finished, and then continue on with the analysis of user "B" samples. In the meantime, user "C" walks up and loads sample tray 3 into the fifth drawer from the top (one of drawers 12, FIG. 1). User "C" then adds 1 job to the queue corresponding to the analysis of 1 row of samples: sample tray 3, row A. This process can continue indefinitely, as long as there is sufficient gel in gel containers (25 in FIG. 2), or if there is sufficient run buffer in the buffer tray (28, FIG. 2) located in top drawer 11, FIG. 1. It is, among other things, the enabling of this workflow, via the drawers 11 and 12, sample stage (x-z stage assembly 48), and computer program with a queue for loading jobs that differentiates the present invention from the prior art systems for CE workflow.

A computer program enables users to load a sample plate 50 into the desired vertical drawer (12, FIG. 1), and instruct the system 16 to run the desired rows or entire sample plate 50, while the system 16 is running other samples. This allows multiple users to load samples and/or sample plates 50, or a single user to load multiple samples and/or sample plates 50 without first having to wait for the electrophoresis of other samples to be complete.

Figure 9:
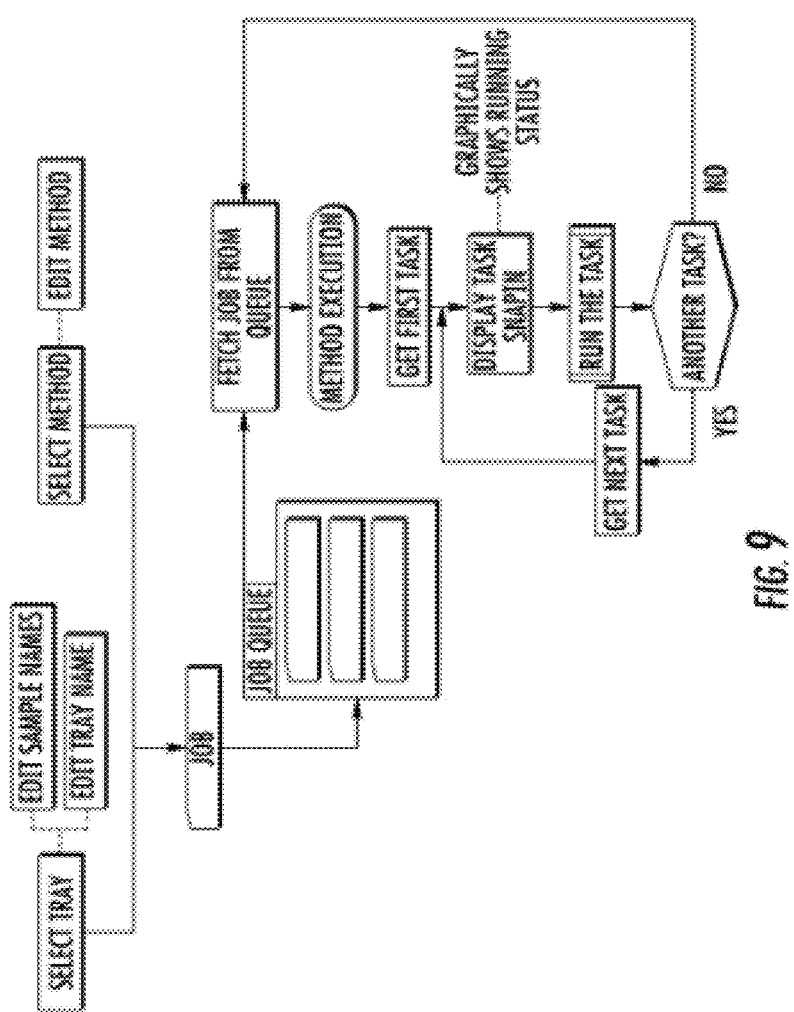
FIG. 9 shows the flow-chart for the software control program for creating a queue of jobs.

FIG. 9 shows the general flow diagram of the work process and computer program. A user loads a sample tray 50 into a drawer (12, FIG. 1) of the system 16. On the computer, user then selects the sample tray 50, edits sample names and/or tray name. User further selects or defines a method (time of separation, electric field used for separation, gel selection, etc.). This selected sample tray 50, along with an associated method is defined as a "job", which is then placed into a queue. The computer as an instrument control device, fetches jobs from the queue, and controls the instrument system 16) for every task, including operation of the syringe pump 23, operation of the high voltage power supply 65, and the motion control stage (48, FIG. 3). For each run (or job), there may be a variety of tasks, with each task requiring direct command and control of subunits of the system 16. Tasks associated with control of the syringe pump 23 include emptying/filling the capillary reservoir 20 with conditioning fluid, forcing conditioning fluid through the capillaries 72, emptying/filling the capillary reservoir 20 with gel, and forcing gel through the capillaries 72. Tasks associated with control of the x-z stage asssembly 48 may include moving or removing a waste tray to/from the inlet side of the capillaries 72 and electrodes 71 of the capillary array 17, moving or removing a buffer tray 28 to/from the side of the capillaries 72 and electrodes 71 of the capillary array 17, or moving/removing a sample tray 50 to/from the side of the capillaries 72 and electrodes 71 of the capillary array 17. Tasks associated with control of the high voltage power supply 65 include turning off/on a high voltage for capillary electrophoresis separation. Other tasks are associated with the camera 64 (acquisition of data), and block valves 21 and 132. For each set of samples, the program will complete all tasks required to obtain a set of electropherograms. Once these tasks are complete, the program fetches another job from the queue. If the queue is empty, all sample runs are complete (until the user initiates another queue).

Figure 10:
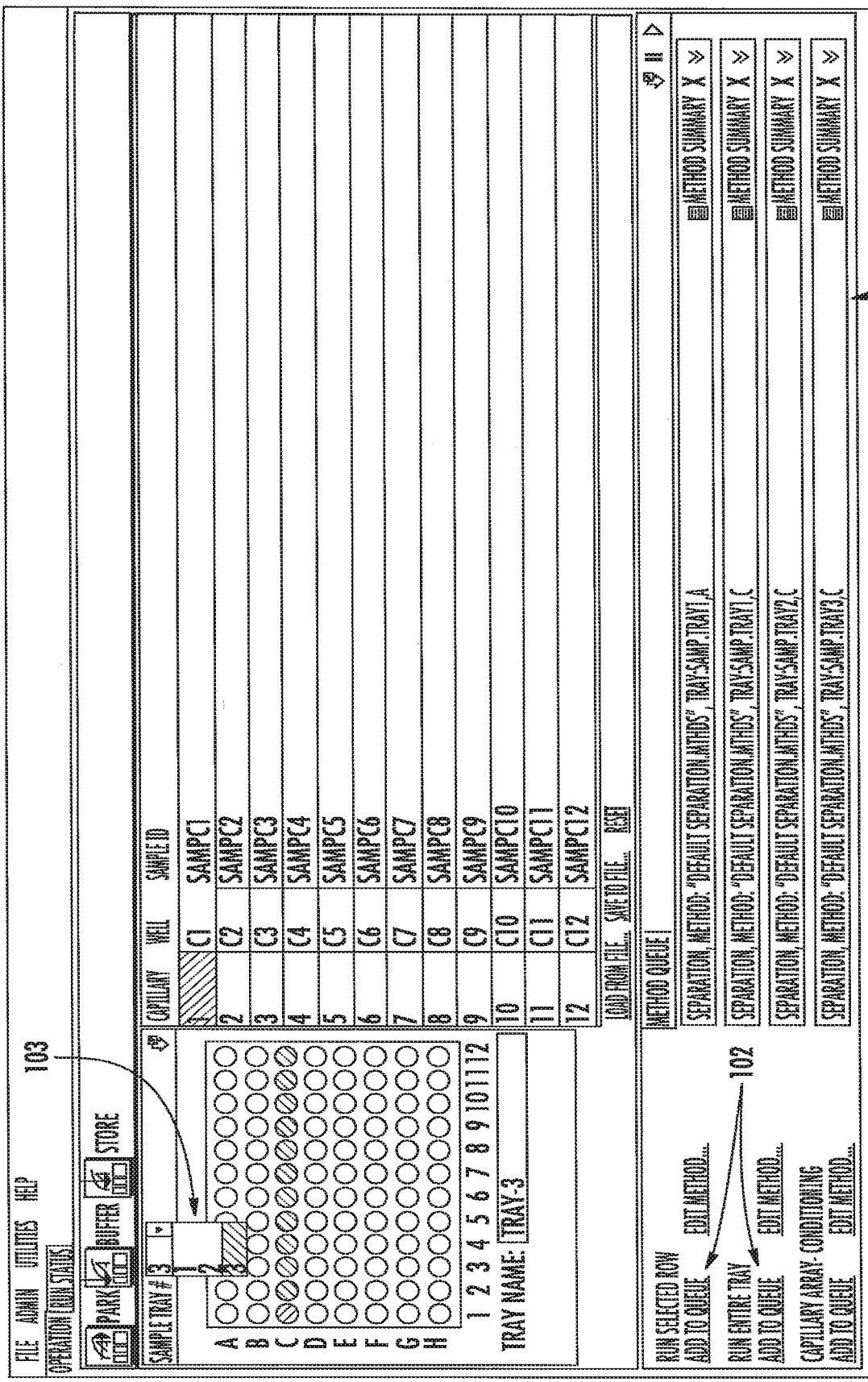
FIG. 10 shows a computer screen image of the computer software.

The graphical result of this computer program is shown in FIG. 10, which shows a list of samples to be analyzed in queue 101, an option to add rows or sample trays 50 to the queue 102, and an option to select the tray number for analysis 103. It is these three aspects that are critical to software portion of the invention: a) Selection of tray 103 (corresponding to a drawer 12 FIG. 1) b) Adding the sample set to a queue (102, FIG. 10) and c) A queue of active samples for analysis (101, FIG. 10), which are executed in sequence until all jobs are complete. Another critical aspect is the ability to add samples to instrument drawers (11, 12, FIG. 1) and queue (101, FIG. 10) while the instrument (system 16) is running other samples.

Figure 14A:
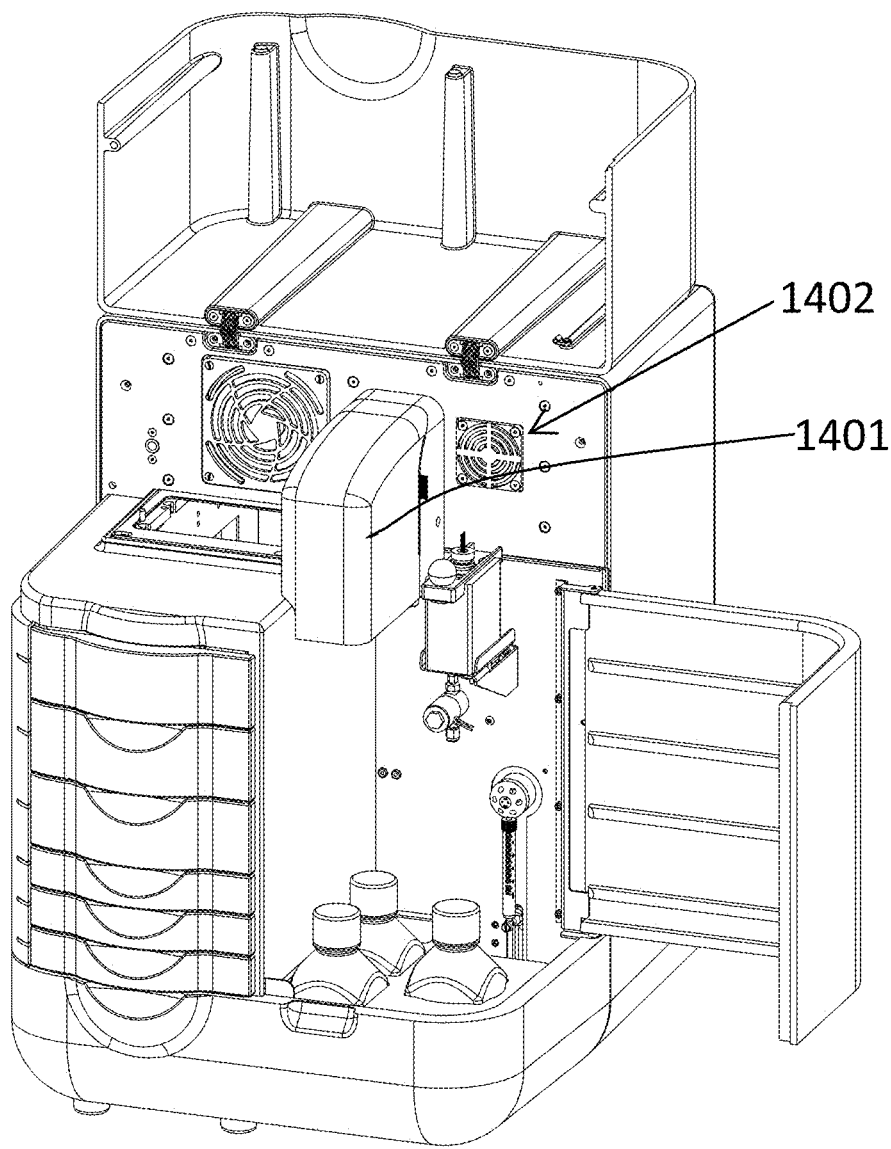
FIG. 14A shows an alternate electrophoresis system with an optics path cover.
Figure 14B:
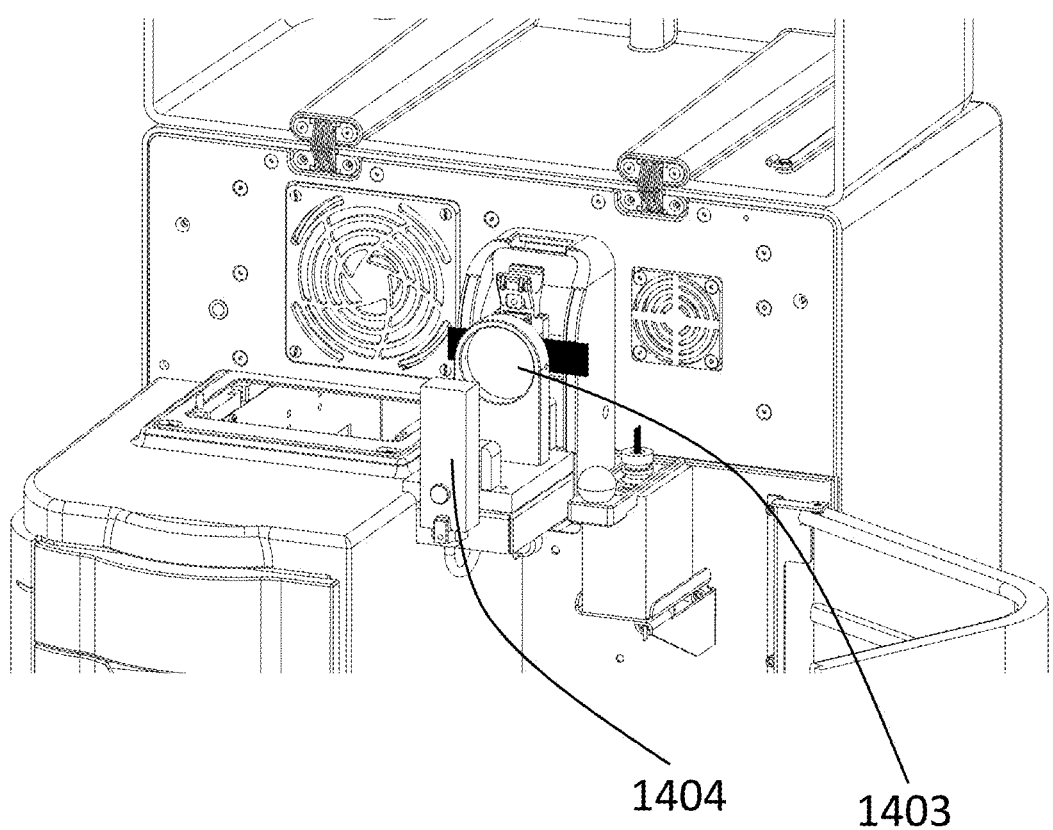
FIG. 14B shows an alternative electrophoresis system with the optics path cover removed.
Figure 14C:
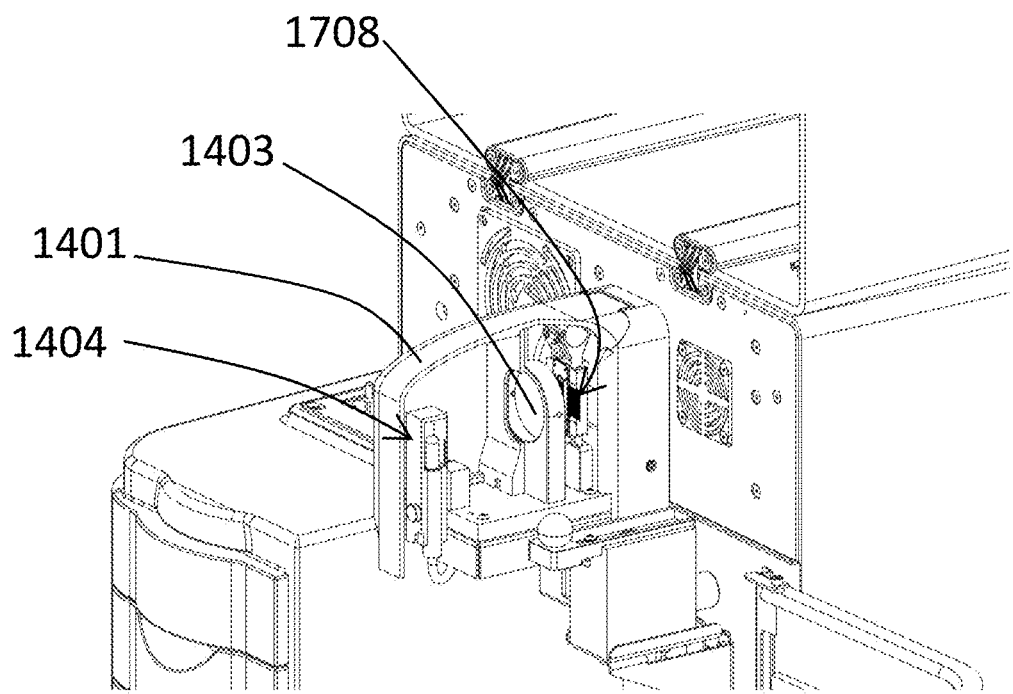
FIG. 14C shows an alternative electrophoresis system with a cut-out view of the optics path cover.

An example of an electrophoresis system modified to operate with absorbance-based detection is shown in FIGS. 14A-14C, 16A and 16B, which in particular may be an ultraviolet (UV) light absorbance-based multiplexed capillary electrophoresis system. An absorbance-based system includes an ultraviolet (UV) or visible light source such as (but not limited to) a mercury lamp, a zinc lamp, a Light-Emitting Diode, deuterium lamp, or tungsten lamp. The absorbance-based system includes a first enclosure (or lamp housing) 1404 and a second enclosure 1401. The second enclosure (1401 FIG. 14A) encloses and seals the light within the first enclosure (lamp housing) (1404 FIG. 14B) as well as a collimating lens (1403 FIG. 14B) up to the capillary window 79, such that the collimating lens 1403 is disposed between a UV light source 1603 in the first enclosure (lamp housing) 1404 and the capillary window 79. The second enclosure 1401 (FIG. 14A) substantially blocks access of any airflow to the optics train. An optional additional fan port with a fan (1402 FIG. 14A) is used to circulate air for cooling the capillaries (capillary bundle 1708, FIG. 17) close to the capillary reservoir (the capillary reservoir 20 shown in FIGS. 2, 6, 12A and 12B, or the capillary reservoir shown in FIGS. 15A and 15B). The UV light source 1603 within the first enclosure (lamp housing) (1404 FIG. 14B) along with the collimating lens (1403 FIG. 14B) is used to direct and focus the light onto the capillary array window 79. FIG. 14C shows a cutout view of the second enclosure 1401, showing the first enclosure (lamp housing) 1404, collimating lens 1403, and capillary bundle 1708.

Figure 15A:
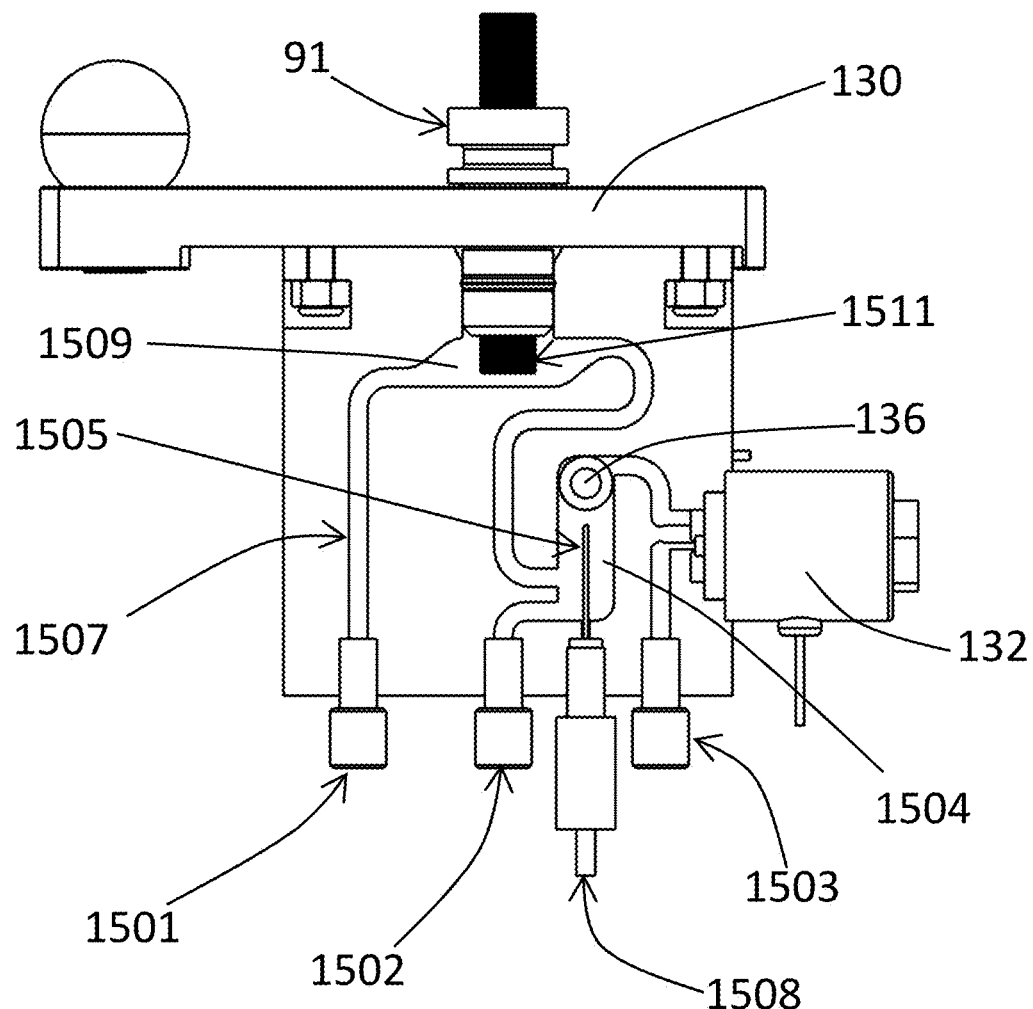
FIG. 15A shows an alternate electrophoresis reservoir system.

An alternate reservoir design is shown in FIG. 15A, with fluid ports 1501, 1502, and 1503. Ports 1501 and 1502 may be used to pump fluids into and out of the capillary reservoir. Fluid may pass in a continuous path from input port 1501, past (or through) tube 1507, to capillary tip flow chamber 1509, to electrode flow chamber 1504, and finally out the waste port 1503 through waste valve 132. An alternate flow path is from input port 1502, to electrode flow chamber 1504, and finally out the waste port 1503 through waste valve 132. Note that the waste valve 132 in this figure is incorporated into the reservoir block. Port 1503 is only used as a waste port, and thus fluid always flows out of the capillary reservoir through the waste valve 132. Also shown are a pressure transducer 136, and an electrode cord for attachment to ground 1508. The fluid path that runs past (second) the capillary tips 1511 is shown as a tube 1507 which widens into a capillary tip flow chamber 1509. A second relatively large electrode flow chamber 1504 in fluid communication with and part of fluid path 1507 and capillary tip flow chamber 1509 is used to house and contain the (ground) electrode 1505 (which is attached to electrode cord 1508). Any bubbles generated by the electrode 1505 during electrophoresis are contained to the electrode flow chamber 1504, and cannot easily reach the capillary tips 1511 or capillary flow chamber 1509. The electrode flow chamber 1504 is positioned such that the highest point, corresponding to the location of the pressure transducer 136 is lower than the capillaries (in particular the capillary tips 1511) or lower than the lowest point in the capillary flow chamber 1509. The electrode flow chamber 1504 has a diameter that is at least 2× that of the general fluid flow path 1507. Prior to initially performing a series of electrophoresis runs, a preferable step is to pump gel from port 1501 past capillary tips 1511 through capillary flow chamber 1509 through the waste valve 132 while port 1502 is blocked. For an intermediate purge of gel between runs, a preferable flow path is from port 1502 through port 1503 via waste valve 132 with port 1501 blocked. When ports 1502 and 1503 are blocked, gel or other fluids are pressurized through capillary tips 1511 by applying fluid flow through port 1501 while monitoring pressure through pressure transducer 136. The wide flow path of the electrode flow chamber 1504 provides a relatively large gel volume in which the electrode 1505 for attachment to ground 1508 is affixed.

Figure 15B:
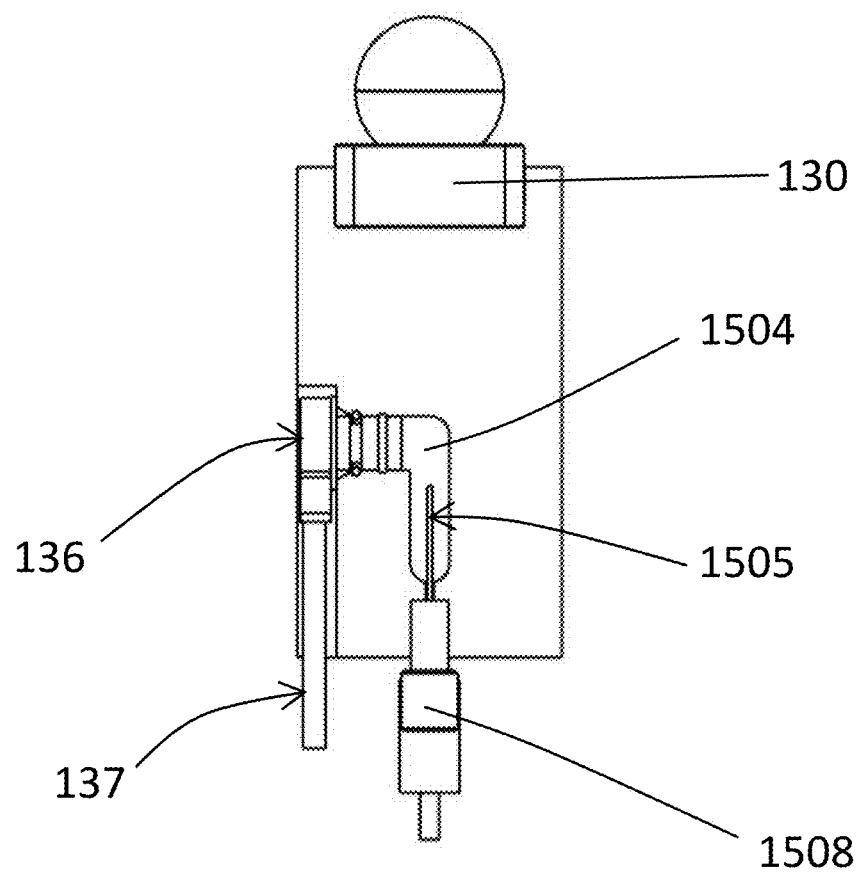
FIG. 15B shows a side view of an alternate electrophoresis reservoir system.

FIG. 15B shows a side-view of the capillary reservoir emphasizing the relative orientation of pressure transducer 136, pressure transducer cable for attachment to analog/digital board 137 electrode chamber 1504, and electrode 1505.

Figure 16A:
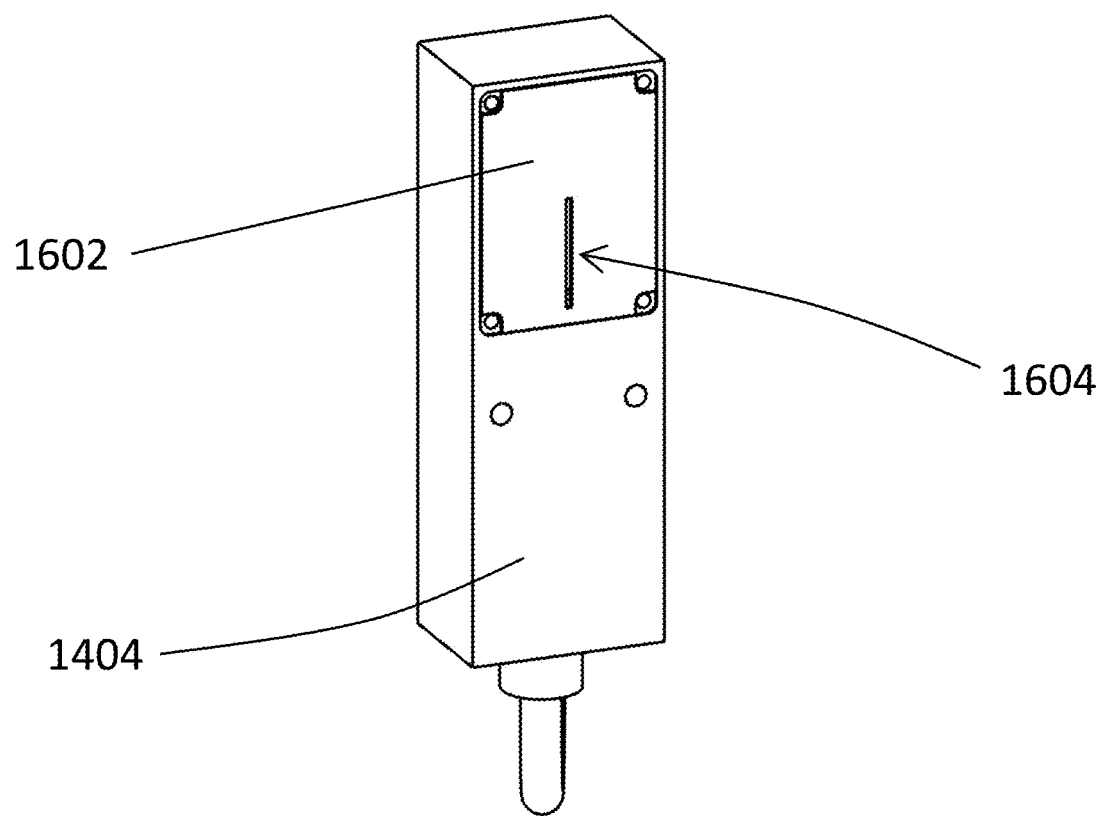
FIG. 16A shows a light-source box with a slit cover.
Figure 16B:
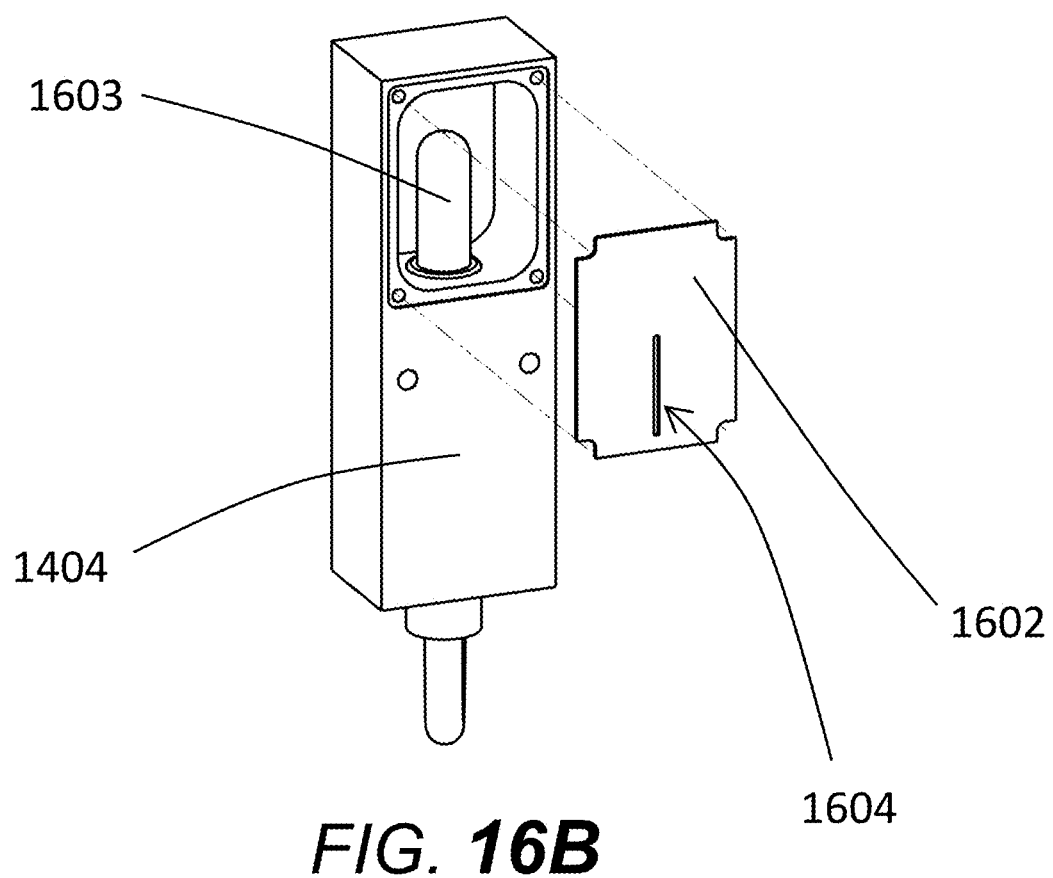
FIG. 16B shows a light-source box with the slit removed.

FIG. 16A shows a close-up of the first enclosure (lamp housing) 1404, where a light source or lamp (1603, FIG. 16B) is fixed within a hollow rectangular box (1404) covered with a plate or slit cover (1602) containing a slit (1604) allowing emission of the light to the capillary windows (79, FIG. 17) through the collimating lens 1403. FIG. 16B shows lamp housing 1404 with plate 1602 removed, revealing lamp or light source 1603. A power cable for the lamp 1603 extends from the bottom of lamp housing 1404. The width of the slit 1604 within the plate (1604) may vary from 50 micrometers up to 4000 micrometers, with a preferable slit width range of 500 to 1500 micrometers.

Figure 17:
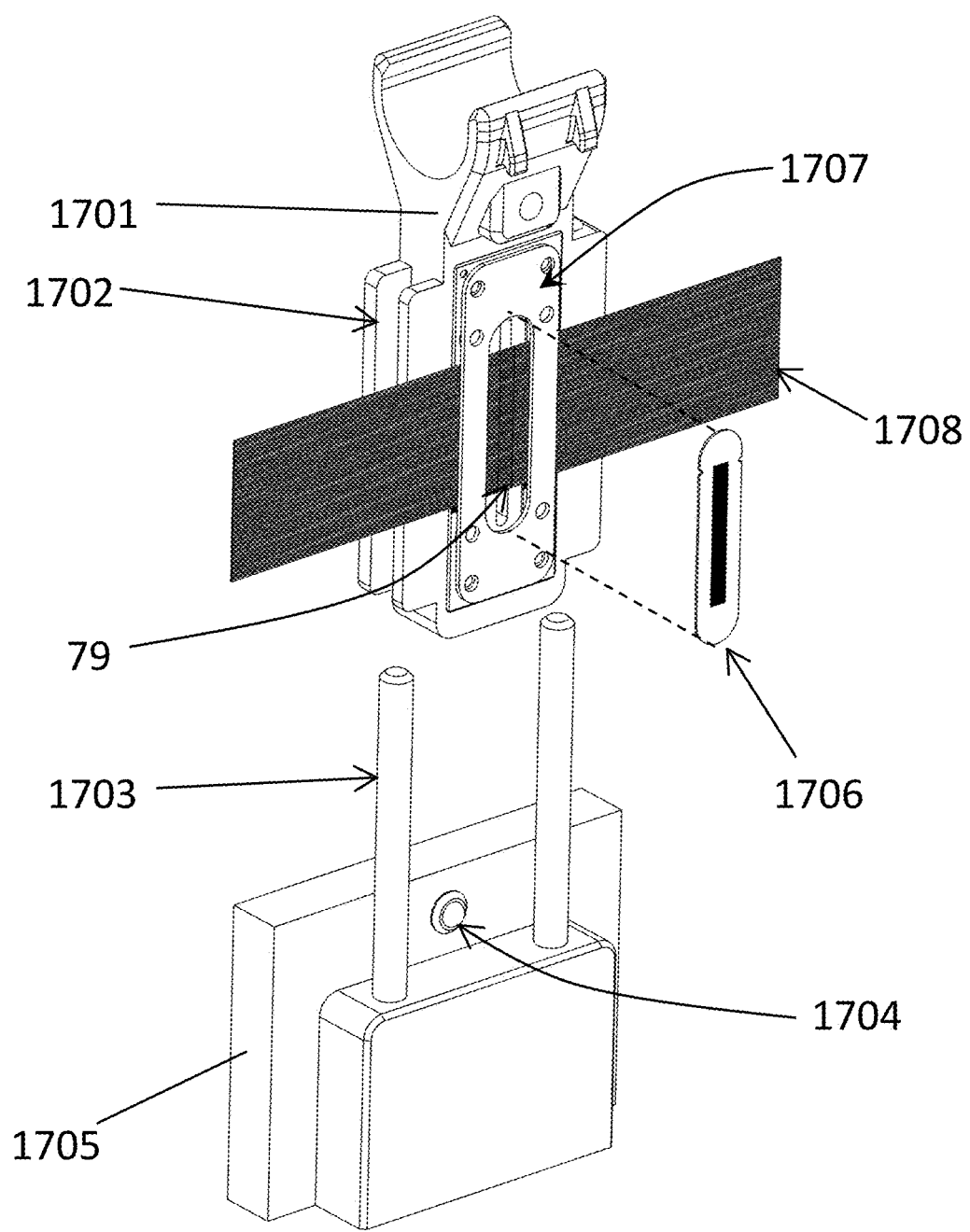
FIG. 17 shows a sliding-interlocking capillary array window mounting mechanism.

FIG. 17 shows an alternate capillary array window block 1701, which is mounted into the electrophoresis system 16 by sliding the window holder slots 1702 over two guide posts 1703 onto instrument mount 1705. The capillary array window block 1701 snaps into place with a spring-pressure ball snap connector 1704. External pressure mount 1707 affixes capillary bundle 1708 in the capillary array window block 1701 and is held in place by adhesive, screws, or any other attachment means. A slit or mask 1706 which is described in U.S. Pat. No. 5,900,934 (Gilby) is optionally placed in front of the capillary array or bundle 1708 to limit or direct light from the light source to individual capillaries.

Figure 18A:
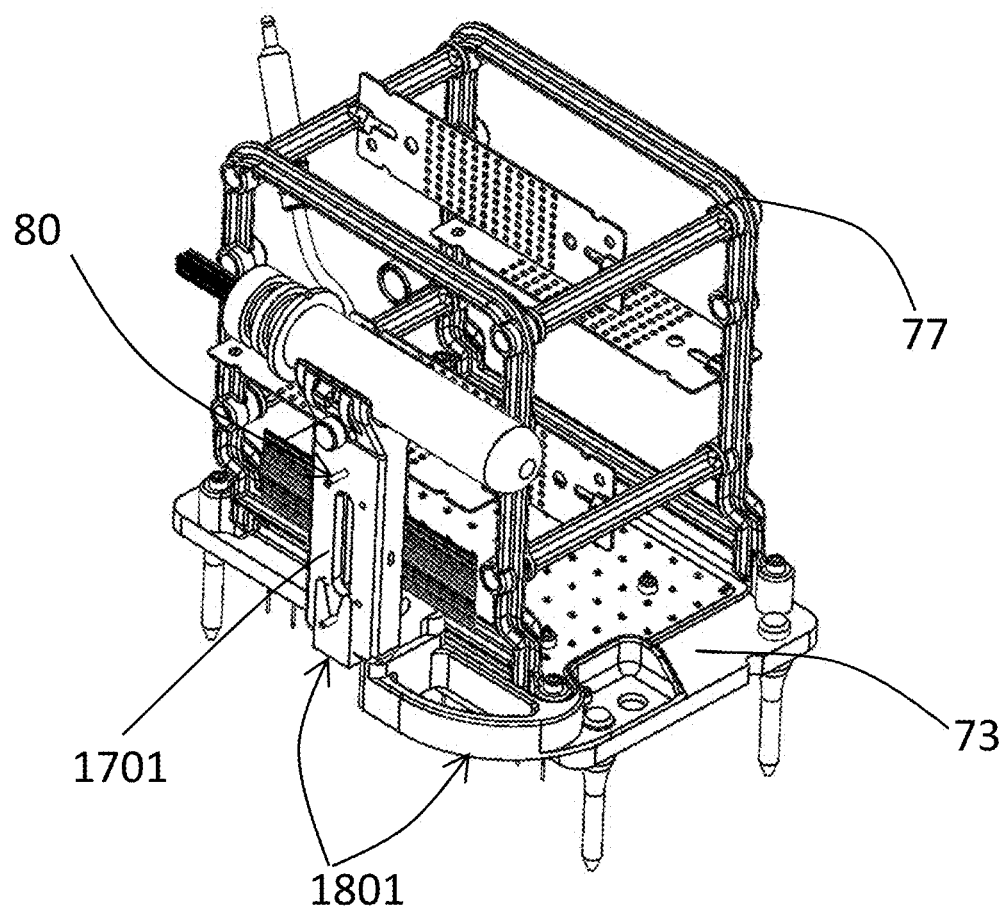
FIG. 18A show an alternate capillary array cartridge design.

FIG. 18A shows an alternate capillary array, with capillary array window block 1701 mounted for storage and transport to the insulating support structure or load header 73 with a window storage and transport screw (80, FIG. 8 and FIG. 18A) attached to single-piece bridging or connecting piece 1801. The single bridging or connecting piece 1801 is not attached to rigid frame 77 (FIG. 8 and FIG. 18A) but instead is attached to the insulating support structure or load header 73 by an adhesive, screw, or any other common method of attachment.

Figure 18B:
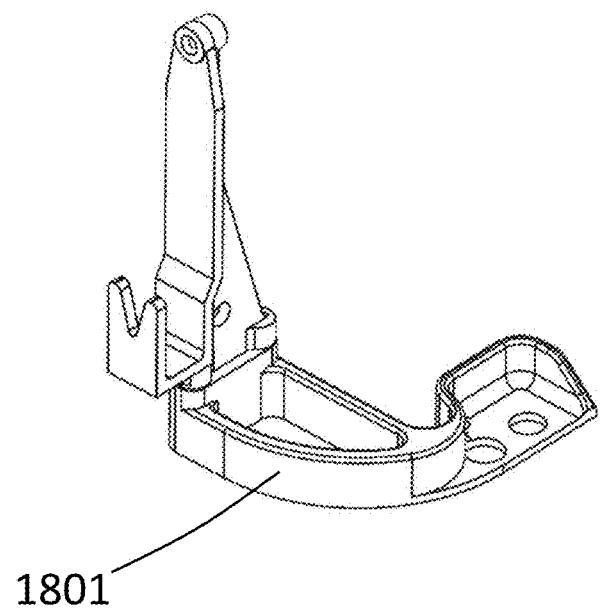
FIG. 18B shows an adaptor for mounting a capillary array window to the array base plate.

FIG. 18B shows single-piece bridging or connecting piece 1801, which allows the capillary array window block 1701 to be mounted to the insulating support structure or load header 73.

The following example is offered to illustrate certain aspects of the invention without in any way limiting it.

Example 1

Figure 19A:
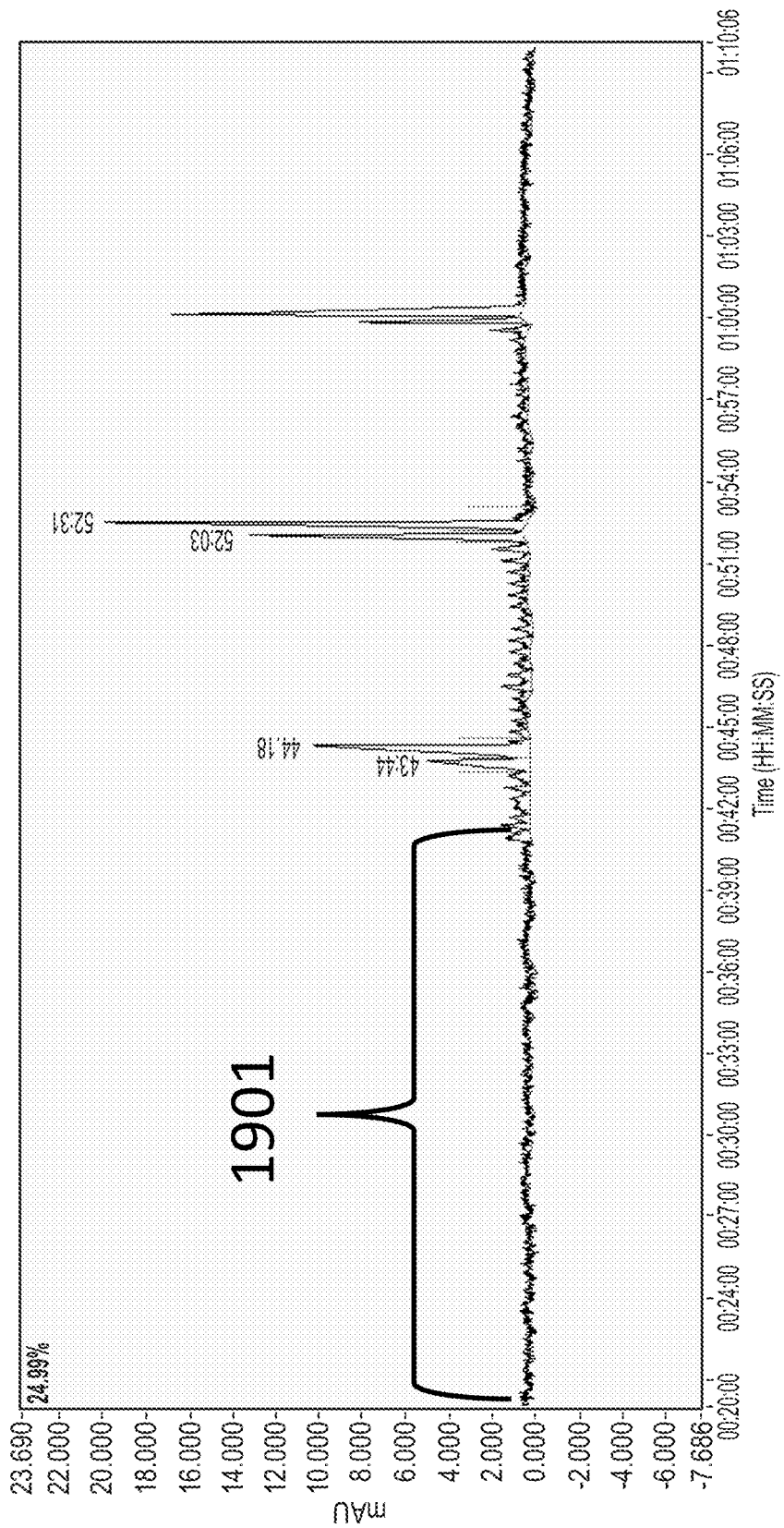
FIG. 19A shows an electropherogram run obtained with the electrophoresis system of the invention.
Figure 19B:
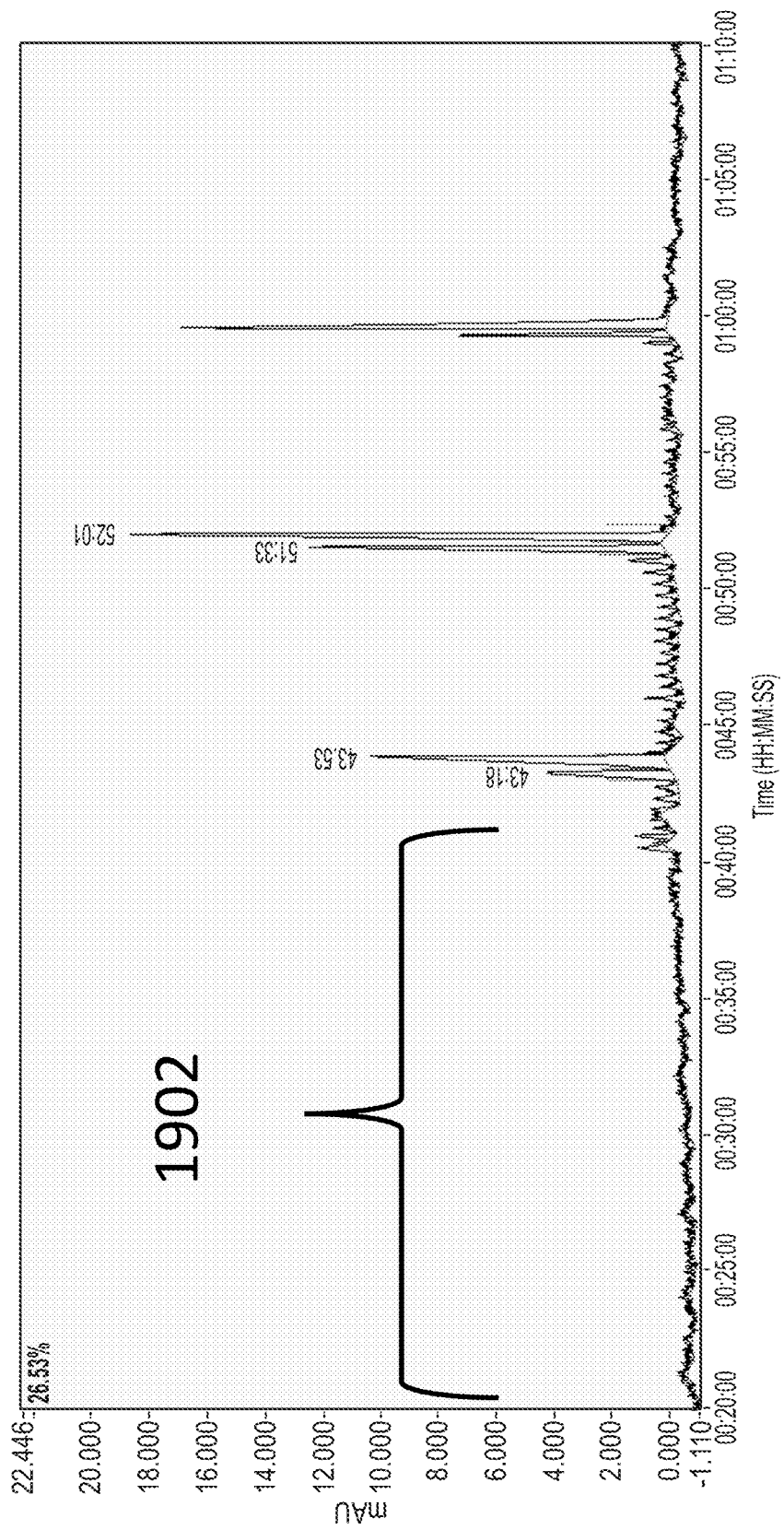
FIG. 19B shows another electropherogram run with use of an enclosure of FIG. 14A.
Figure 19C:
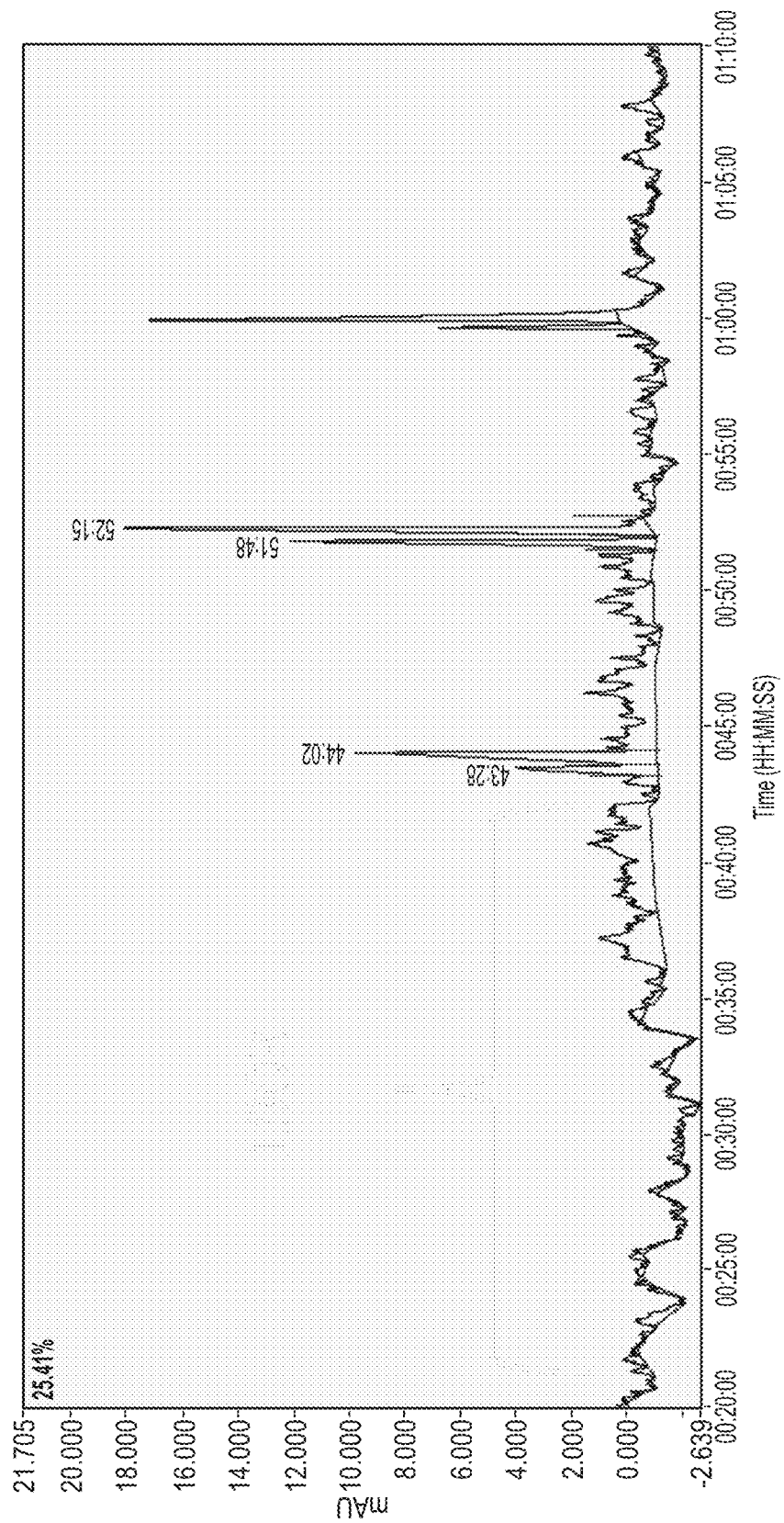
FIG. 19C shows an electropherogram run with a slit and enclosure of FIG. 14A removed.

A denaturing single-stranded oligomer gel or sieving matrix "DN-415" (available from Advanced Analytical Technologies, Inc.) was used for this example. The "DN-415" sieving matrix was pumped into a plurality of ninety-six capillaries with an effective length of 55 centimeter (cm) and a total length of 80 cm (75 micron I.D.) using the capillary electrophoresis system described in this specification. An oligomer mix standard, consisting of 10 micromolar each of poly-T oligomers 19-mer, 20-mer, 39-mer, 40-mer, 59-mer, and 60-mer was used to evaluate separation efficiency. The conditions used for obtaining the electropherograms in this example are: 1) the gel-filled capillaries were treated with an electrophoresis pre-run by applying 12 kV for 20 minutes prior to injection of sample; 2) the oligomer mix standard was injected onto the capillary electrophoresis system (present invention) using an electrokinetic injection of 3 kV for 7 sec., and 3) this was immediately followed by an electrophoresis run using a constant applied voltage of 12 kV for 70 minutes. FIG. 19A shows an electropherogram run obtained with the electrophoresis system of the present invention with the second enclosure 1401 (FIG. 14A) and lamp housing slit cover 1602 (FIG. 16). Region 1901 of the electropherogram shows a low level of baseline noise. FIG. 19B shows an electropherogram run obtained with the electrophoresis system of the present invention with second enclosure 1401 (FIG. 14A) removed from the system and lamp housing slit cover 1602 (FIG. 16) remaining on the system. Region 1902 in FIG. 19B of the electropherogram shows a higher baseline noise and drift relative to region 1901 in FIG. 19A. FIG. 19C shows an electropherogram run obtained with the electrophoresis system of the present invention with second enclosure 1401 (FIG. 14A) removed from the system and lamp housing slit cover 1602 (FIG. 16) also removed from the system. Region 1903 in FIG. 19C of the electropherogram shows a significantly higher baseline drift and noise relative to region 1901 in FIG. 19A. This example shows that the lamp housing slit cover 1602 and second enclosure 1401 are important in obtaining electropherograms with low baseline noise and drift.

As can be seen from the above description, the system eliminates the need for expensive robots, enables the user to run many samples per day, allows loading of new samples while running others, and yet has a small size footprint. Furthermore, the present invention enables the analysis of samples with high quality signal to noise, and a low level of baseline drift. It therefore fulfills the need described.

What is claimed is:

1. An ultraviolet (UV) light absorption-based multiplexed capillary electrophoresis system, comprising:
a console comprising an injection position;
a replaceable capillary array disposed in the console, and comprising a plurality of capillaries comprising respective capillary tips disposed at the injection position;
a power supply disposed in the console and configured to apply a voltage across each of the capillaries effective for performing capillary electrophoresis on samples in the capillaries;
a detector disposed in the console and configured to detect light transmitted from the capillaries for acquisition of absorbance data;
a plurality of drawers disposed in the console and configured to hold a plurality of multi-well plates, each drawer movable between a closed position inside the console and an open position outside the console at which the drawer is externally accessible, the plurality of drawers comprising at least a first drawer and a second drawer;
a motion control system disposed in the console and configured to move one or more of the multi-well plates from one or more of the respective drawers to the injection position; and
a control device programmed to control an operation of the multiplex capillary electrophoresis system, the operation comprising sequentially performing at least a first job and a second job according to a job queue inputted by one or more users into the control device, wherein:
the first job comprises operating the motion control system to move a first multi-well plate loaded in the first drawer to the injection position such that the capillary tips extend into respective wells of the first multi-well plate, injecting a first sample from the first multi-well plate into at least some of the capillaries, and operating the power supply to apply the voltage to perform a first electrophoresis run on the first sample;
the second job comprises operating the motion control system to move a second multi-well plate loaded in the drawer to the injection position such that the capillary tips extend into respective wells of the second multi-well plate, inject a second sample from the second multi-well plate into at least some of the capillaries, and operating the power supply to apply the voltage to perform a second electrophoresis run on the second sample; and
the control device is configured to control performing the first electrophoresis run while the second multi-well plate is being loaded into the second drawer while the second drawer is in the open position.

2. The system of claim 1, wherein the motion control system comprises a rotational encoder.

3. The system of claim 1, wherein the motion control system comprises a linear encoder.

4. The system of claim 1, wherein the plurality of drawers comprises at least four vertically stacked drawers.

5. The system of claim 1, wherein the plurality of drawers comprises at least six vertically stacked drawers.

6. The system of claim 1, wherein the capillary array comprises a capillary window, and the system further comprises:
a UV light source;
a first enclosure covering the UV light source, wherein the first enclosure comprises a slit;
a collimating lens disposed between the UV light source and the capillary window; and
a second enclosure covering the first enclosure, the collimating lens, and the capillary window.

7. The system of claim 1, comprising a capillary reservoir, the capillary reservoir comprising:
a fluid input port;
a capillary tip flow chamber in which the capillary tips are disposed, the capillary tip flow chamber configured to conduct fluid past the capillary tips;
a ground electrode;
an electrode flow chamber in which the ground electrode is disposed and configured to conduct fluid past the ground electrode, the electrode flow chamber positioned separately from and in fluid communication with the capillary tip flow chamber;
a waste port; and
a tube defining a fluid flow path from the fluid input port to the capillary tip flow chamber, to the electrode flow chamber, and to the waste port,
wherein a highest point of the electrode flow chamber is lower than a lowest point of the capillary tip flow chamber.

8. The system of claim 1, wherein the motion control system comprises:
a tray carrier configured to support a selected multi-well plate of the plurality of multi-well plates;
an x-drive motor configured to drive motion of the tray carrier back and forth relative to the plurality of drawers; and
a z-drive motor configured to drive motion of the tray carrier up and down relative to the plurality of drawers.

9. The system of claim 1, wherein the control device is configured to control performing the first electrophoresis run while a user of the one or more users is inputting the second job into the job queue.

10. The system of claim 1, comprising a plurality of injection electrodes communicating with the power supply and disposed adjacent and parallel to the capillary tips.

11. The system of claim 1, wherein the tray carrier comprises one or more alignment pins configured to engage a tray holder of the selected multi-well plate.

12. The system of claim 1, wherein each drawer comprises one or more alignment pins configured to engage a tray holder of a selected multi-well plate of the plurality of multi-well plates.

* * * * *

UNITED STATES PATENT AND TRADEMARK OFFICE
CERTIFICATE OF CORRECTION

| | | |
|---|---|---|
| PATENT NO. | : 11,340,191 B2 | |
| APPLICATION NO. | : 15/677535 | |
| DATED | : May 24, 2022 | |
| INVENTOR(S) | : Michael Stebniski et al. | |

It is certified that error appears in the above-identified patent and that said Letters Patent is hereby corrected as shown below:

In the Specification

In Column 5, Line 49, delete "17" and insert -- 71 --.

In Column 10, Line 12, delete "asssembly" and insert -- assembly --.

In Column 11, Line 19, delete "(second) the" and insert -- the (second) --.

In Column 11, Line 55, delete "(1404)" and insert -- (designated by the lead line for 1404) --.

Signed and Sealed this
Twenty-fifth Day of October, 2022

Katherine Kelly Vidal
*Director of the United States Patent and Trademark Office*